(12) United States Patent
Li et al.

(10) Patent No.: US 12,439,226 B2
(45) Date of Patent: Oct. 7, 2025

(54) COMMUNICATION METHOD AND DEVICE

(71) Applicant: Huawei Technologies Co., Ltd., Shenzhen (CN)

(72) Inventors: Bingzhao Li, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 457 days.

(21) Appl. No.: 17/644,915

(22) Filed: Dec. 17, 2021

(65) Prior Publication Data
US 2022/0109963 A1 Apr. 7, 2022

Related U.S. Application Data

(63) Continuation of application No. PCT/CN2020/097234, filed on Jun. 19, 2020.

(30) Foreign Application Priority Data

Jun. 20, 2019 (CN) .......................... 201910539453.4

(51) Int. Cl.
H04W 4/06 (2009.01)
H04W 72/23 (2023.01)
H04W 76/28 (2018.01)

(52) U.S. Cl.
CPC .............. *H04W 4/06* (2013.01); *H04W 72/23* (2023.01); *H04W 76/28* (2018.02)

(58) Field of Classification Search
CPC ....... H04W 4/06; H04W 72/23; H04W 76/28; H04W 72/30; H04W 76/40; H04W 72/0453; H04W 72/12
See application file for complete search history.

(56) References Cited

U.S. PATENT DOCUMENTS

| 2005/0043050 | A1* | 2/2005 | Lee ..................... H04W 72/30 |
| | | | 455/515 |
| 2012/0008543 | A1 | 1/2012 | Gou et al. |
| 2014/0185455 | A1 | 7/2014 | Balasubramanian et al. |
| 2016/0241412 | A1 | 8/2016 | Panchal et al. |
| 2017/0295005 | A1 | 10/2017 | Lee et al. |
| 2018/0054821 | A1* | 2/2018 | Sun .................. H04W 72/0453 |

(Continued)

FOREIGN PATENT DOCUMENTS

| CN | 101808281 A | 8/2010 |
| CN | 102348164 A | 2/2012 |

(Continued)

OTHER PUBLICATIONS

Huawei, "SC-PTM corrections following ASN.1 review", 3GPP TSG-RAN Meeting #93 , R2-161601, St Julian's, Malta, Feb. 15-19, 2016, 492 pages.

(Continued)

*Primary Examiner* — Dinh Nguyen
(74) *Attorney, Agent, or Firm* — Slater Matsil, LLP

(57) ABSTRACT

A first network device determines a first parameter for a first multicast service. The first network device sends the first parameter to a network device corresponding to at least two cells, where the at least two cells are associated with the first multicast service, and the first parameter indicates a resource for transmission of the first multicast service.

20 Claims, 9 Drawing Sheets

(56) References Cited

U.S. PATENT DOCUMENTS

| | | | |
|---|---|---|---|
| 2018/0098287 A1* | 4/2018 | Ang | H04W 52/0229 |
| 2018/0288746 A1* | 10/2018 | Zhang | H04L 1/0031 |
| 2018/0367386 A1 | 12/2018 | Liao | |
| 2019/0132141 A1 | 5/2019 | Li et al. | |
| 2019/0274131 A1 | 9/2019 | Yamazaki et al. | |

FOREIGN PATENT DOCUMENTS

| | | | | |
|---|---|---|---|---|
| CN | 102595326 A | * | 7/2012 | H04W 36/0007 |
| CN | 105556996 A | | 5/2016 | |
| CN | 107205228 A | | 9/2017 | |
| CN | 107920334 A | | 4/2018 | |
| CN | 108293227 A | | 7/2018 | |
| CN | 108702592 A | | 10/2018 | |
| CN | 109392131 A | * | 2/2019 | H04B 1/713 |
| CN | 109906651 A | | 6/2019 | |
| CN | 112640492 A | | 4/2021 | |
| EP | 3308501 A1 | | 4/2018 | |
| EP | 3346640 A1 | | 7/2018 | |
| EP | 3393175 A1 | | 10/2018 | |
| WO | 2016204519 A1 | | 12/2016 | |
| WO | WO-2018000360 A1 | * | 1/2018 | H04L 12/1836 |
| WO | 2018021298 A1 | | 2/2018 | |
| WO | 2018082076 A1 | | 5/2018 | |

OTHER PUBLICATIONS

LG Electronics Inc., "Discussion on how to support dynamic scheduling for multicast/broadcast transmissions", 3GPP TSG-RAN WG3 Meeting#92, R3-161093, Nanjing, China, May 23-27, 2016, 5 pages.

Vivo, "Discussion on Rate Matching", 3GPP TSG RAN WG1 NR Ad Hoc #3, R1-1715617, Nagoya, Japan, Sep. 18-21, 2017, 5 pages.

Huawei et al., "Rel-17 work scope on NR Multicast and Broadcast Services", 3GPP TSG RAN Meeting #84, RP-191012, Newport Beach, US, Jun. 3-7, 2019, 4 pages.

Nokia et al., "SC-MTCH transmission for NB-IoT", 3GPP TSG RAN WG1 Meeting #86-bis, R1-1608885, Oct. 10-14, 2016, 5 Pages, Lisbon, Portugal.

* cited by examiner

COMMUNICATION METHOD AND DEVICE

CROSS-REFERENCE TO RELATED APPLICATIONS

This application is a continuation of International Application No. PCT/CN2020/097234, filed on Jun. 19, 2020, which claims priority to Chinese Patent Application No. 201910539453.4, filed on Jun. 20, 2019. The disclosures of the aforementioned applications are hereby incorporated by reference in their entireties.

TECHNICAL FIELD

This application relates to the field of communication technologies, and in particular, to a communication method and device.

BACKGROUND

Single cell point to multipoint (SC-PTM) is a multicast transmission technology. In the SC-PTM technology, in an area, only in a cell that includes a user, data needs to be sent to the user, and in a cell that does not include a user, no data needs to be sent. In this way, air interface resources are saved.

Currently, in the SC-PTM technology, there is no connection between transmission of two cells. For example, a cell 1 and a cell 2 are two neighboring cells, and SC-PTM transmission is being performed in each of the two cells. In the cell 1, there is a terminal device that receives a first service, and in the cell 2, there is also a terminal device that receives a first service. However, the terminal device in the cell 1 does not receive the first service sent in the cell 2, and the terminal device in the cell 2 does not receive the first service sent in the cell 1. For example, for the terminal device in the cell 1, the first service sent in the cell 2 is an interfering signal.

In this case, for example, a terminal device is located at an edge of the cell 1, and in an area close to the cell 2, reception quality of the terminal device in the cell 1 may be poor. However, the terminal device is close to the cell 2, and interference caused by the cell 2 is large, and this further causes deterioration of the reception quality of the terminal device.

It can be learned that the current SC-PTM technology may cause reception quality of a terminal device at an edge of a cell to be poor.

SUMMARY

Embodiments of this application provide a communication method and a device, to improve transmission performance of a terminal device.

According to a first aspect, a first communication method is provided. The method includes: A first network device determines a first parameter for a first multicast service, where the first multicast service is associated with at least two cells, and the first parameter indicates a resource for transmission of the first multicast service. The first network device sends the first parameter to a second network device, where the second network device is associated with the at least two cells.

The method may be performed by a first communication apparatus. The first communication apparatus may be a communication device or a communication apparatus, for example, a chip system, that can support a function required by the communication device to implement the method. For example, the communication device is the first network device. For example, the first network device is an MCF.

In this embodiment of this application, if the first multicast service needs to be sent in each of the at least two cells, the first network device may determine the first parameter for the first multicast service, and send the first parameter to the network device corresponding to the at least two cells, so that the network device corresponding to the at least two cells may schedule the first multicast service by using the first parameter. This is equivalent to breaking a cell boundary, so that combined transmission is implemented in the at least two cells. If a terminal device located in one of the at least two cells is located at an edge of the cell, and the terminal device can receive a signal of another cell of the at least two cells, the terminal device can receive a first multicast service sent in the another cell. In this way, because a same parameter is used for a same multicast service, a terminal device located at an edge of a cell is not limited to only being capable of receiving a multicast service of the cell, and may also receive the same multicast service sent in another cell, so that a receiving success rate of the terminal device can be improved. In addition, the same multicast service sent in the another cell is no longer an interfering signal for the terminal device, so that reception quality of the terminal device is improved.

With reference to the first aspect, in a possible implementation of the first aspect, the first parameter includes any combination of one or more of the following:

configured grant information of the first multicast service;

information about an RNTI corresponding to the first multicast service;

a DRX parameter corresponding to the first multicast service;

configuration information of a demodulation reference signal corresponding to the first multicast service;

rate matching reference signal information, used to indicate a location that is of a reference signal and that needs to be excluded when the first multicast service is received;

information about a scrambling sequence used by a PDSCH that carries the first multicast service; or a service multiplexing identifier corresponding to the first multicast service, where the service multiplexing identifier is used to indicate data of the first multicast service.

This embodiment is not limited to the foregoing parameters. In addition to the foregoing parameters, the first parameter may alternatively be a set A including one or more other parameters as an element. The first network device may explicitly or implicitly notify the parameters shown in the foregoing embodiment based on the parameter set A.

With reference to the first aspect, in a possible implementation of the first aspect, the configured grant information includes any combination of one or more of the following:

time domain information for transmission of the first multicast service;

frequency domain information for transmission of the first multicast service;

the configuration information of the demodulation reference signal corresponding to the first multicast service;

the rate matching reference signal information, used to indicate the location that is of the reference signal and that needs to be excluded when the first multicast service is received;

information about an antenna port for transmission of the first multicast service;

information about a modulation and coding scheme (MCS) corresponding to the first multicast service; or first indication information, used to indicate whether both the RNTI and the configured grant information need to be monitored.

This embodiment is not limited to the foregoing parameters. In addition to the foregoing parameters, the configured grant information may alternatively be a set B including one or more other parameters as an element.

With reference to the first aspect, in a possible implementation of the first aspect, the method further includes: The first network device determines second multicast BWP configuration information, where the second multicast BWP configuration information includes information about at least one BWP, and information about each BWP includes any combination of one or more of the following: frequency domain information, subcarrier spacing information, or cyclic prefix length information. The first network device sends the second multicast BWP configuration information to the second network device.

The second multicast BWP configuration information may be used to indicate BWPs used by all or some multicast services scheduled by the first network device, so that the second network device can determine a BWP used by a corresponding multicast service.

With reference to the first aspect, in a possible implementation of the first aspect, the first parameter further includes BWP indication information; and the BWP indication information is a BWP number, and the BWP number is associated with one piece of information in the information about the at least one BWP.

If the first network device determines multicast BWP configuration information, specific BWP information may be included in the multicast BWP configuration information. For example, the multicast BWP configuration information may include a correspondence between a BWP number and BWP information. To indicate a BWP used by the first multicast service, the first parameter only needs to indicate a corresponding BWP number. The network device may determine, based on the BWP number included in the first parameter and the multicast BWP configuration information, information about the BWP used by the first multicast service.

With reference to the first aspect, in a possible implementation of the first aspect, the first parameter further includes BWP indication information, where the BWP indication information is used to indicate that the first multicast service uses an initial BWP; or the BWP indication information is information about a BWP used by the first multicast service.

Alternatively, the first parameter may not include the BWP number. For example, if the first multicast service uses the initial BWP, the BWP indication information may directly indicate that the first multicast service uses the initial BWP, or may not specifically indicate information about the initial BWP. For each network device, the information about the initial BWP may be obtained in another manner, and does not need to be additionally indicated in the first parameter. Alternatively, the BWP indication information may be the information about the BWP used by the first multicast service. This is equivalent to that the BWP indication information may directly include information about a corresponding BWP, and the network device may determine the information about the BWP based on the BWP indication information. This manner is more direct. If the BWP indication information is the information about the BWP used by the first multicast service, the BWP used by the first multicast service may be the initial BWP, or may be another BWP.

With reference to the first aspect, in a possible implementation of the first aspect, the method further includes: The first network device determines to reserve at least one RNTI for a multicast service. The first network device sends information about the at least one RNTI to the second network device, to indicate the second network device to reserve the at least one RNTI.

It can be learned from the foregoing descriptions that the first network device schedules a multicast service, and it is very likely that another network device (for example, the second network device) also schedules a multicast service. For example, the first network device schedules a multicast service for which combined transmission can be performed, and the another network device schedules a multicast service for which combined transmission cannot be or does not need to be performed. Each network device needs to use a G-RNTI when scheduling a multicast service. Therefore, if different network devices use a same G-RNTI when scheduling different multicast services, a conflict occurs. To avoid this case as much as possible, the first network device may determine at least one RNTI that needs to be reserved for the multicast service, and send the information about the at least one RNTI to another network device, to indicate the another network device to reserve the at least one RNTI, that is, to indicate the another network device not to use the at least one RNTI, so as to avoid the conflict.

With reference to the first aspect, in a possible implementation of the first aspect, the method further includes: The first network device determines the at least two cells based on information about a cell in which a terminal device that is to receive the first multicast service is located, where the first network device obtains, based on information received from a core network device, the information about the cell in which the terminal device that is to receive the first multicast service is located, or the first network device obtains, based on information reported by the terminal device, the information about the cell in which the terminal device that is to receive the first multicast service is located.

A method for determining, by the first network device, the at least two cells is provided. The first network device may determine, based on the information received from the core network, the cell in which the terminal device that is to receive the first multicast service is located, or the first network device may determine, based on the information reported by the terminal device, the cell in which the terminal device that is to receive the first multicast service is located, or the first network device may determine, in another manner, the cell in which the terminal device that is to receive the first multicast service.

According to a second aspect, a second communication method is provided. The method includes: A second network device determines first multicast service configuration information, where the first multicast service configuration information includes one or more parameters associated with transmission of each of at least one multicast service, one of the parameters includes BWP indication information, and the BWP indication information indicates a BWP used by a corresponding multicast service. The second network device sends the first multicast service configuration information to a terminal device.

The method may be performed by a first communication apparatus. The first communication apparatus may be a communication device or a communication apparatus, for example, a chip system, that can support a function required by the communication device to implement the method. For example, the communication device is the second network device. For example, the second network device is a base station.

With reference to the second aspect, in a possible implementation of the second aspect, the one of the parameters further includes any combination of one or more of the following:

configured grant information of the corresponding multicast service;

information about an RNTI corresponding to the corresponding multicast service;

a DRX parameter corresponding to the corresponding multicast service;

configuration information of a demodulation reference signal corresponding to the corresponding multicast service;

rate matching reference signal information, used to indicate a location that is of a reference signal and that needs to be excluded when the corresponding multicast service is received;

information about a scrambling sequence used by a PDSCH that carries the corresponding multicast service; or a service multiplexing identifier corresponding to the corresponding multicast service, where the service multiplexing identifier is used to indicate data of the corresponding multicast service.

With reference to the second aspect, in a possible implementation of the second aspect, the configured grant information includes any combination of one or more of the following:

time domain information for transmission of the corresponding multicast service;

frequency domain information for transmission of the corresponding multicast service;

the configuration information of the demodulation reference signal corresponding to the corresponding multicast service;

the rate matching reference signal information, used to indicate the location that is of the reference signal and that needs to be excluded when the corresponding multicast service is received;

information about an antenna port for transmission of the corresponding multicast service;

information about an MCS corresponding to the corresponding multicast service; or first indication information, used to indicate whether both the RNTI and the configured grant information need to be monitored.

With reference to the second aspect, in a possible implementation of the second aspect, the method further includes: The second network device determines first multicast BWP configuration information, where the first multicast BWP configuration information includes information about at least one BWP, and information about each BWP includes any combination of one or more of the following: frequency domain information, subcarrier spacing information, or cyclic prefix length information. The second network device sends the first multicast BWP configuration information to the terminal device.

With reference to the second aspect, in a possible implementation of the second aspect, the BWP indication information is a BWP number, and the BWP number is associated with one piece of information in the information about the at least one BWP.

With reference to the second aspect, in a possible implementation of the second aspect, the BWP indication information is used to indicate that the first multicast service uses an initial BWP; or the BWP indication information is information about a BWP used by the first multicast service.

With reference to the second aspect, in a possible implementation of the second aspect, the method further includes: The second network device receives second multicast service configuration information from a first network device; and/or the second network device receives second multicast BWP configuration information from the first network device.

After determining the second multicast service configuration information, the first network device may send the second multicast service configuration information to the second network device. After determining the second multicast BWP configuration information, the first network device may also send the second multicast BWP configuration information to the second network device.

With reference to the second aspect, in a possible implementation of the second aspect, the method further includes: The second network device receives information about at least one RNTI from the first network device, and determines not to use the at least one RNTI when configuring an RNTI for a service.

With reference to the second aspect, in a possible implementation of the second aspect, the method further includes: The second network device receives indication information from the first network device, where the indication information is used to indicate the second network device to independently schedule transmission of a second multicast service. The second network device configures a resource to perform transmission of the second multicast service, and adds information about the configured resource to the first multicast service configuration information.

The first network device may schedule a multicast service for which combined transmission can be performed. For a multicast service for which combined transmission cannot be performed, for example, a multicast service that is sent only in one cell, or for a multicast service for which the first network device considers that combined transmission does not need to be performed, for example, a multicast service that is sent in a non-neighboring cell, the first network device may schedule or may not schedule the multicast service. If the first network device also needs to schedule multicast services for which combined transmission cannot be or does not need to be performed, the first network device also determines resource parameters of these multicast services, determines information about BWPs corresponding to these multicast services, adds the resource parameters of these multicast services to the second multicast service configuration information, and adds the information about the BWPs corresponding to these multicast services to the second multicast BWP configuration information. Alternatively, if the first network device does not schedule these multicast services for which combined transmission cannot be or does not need to be performed, the first network device does not configure resources for these multicast services, does not add the resource parameters of these multicast services to the second multicast service configuration information, and does not add the information about the BWPs corresponding to these multicast services to the second multicast BWP configuration information. In addition, if the first network device does not schedule these multicast services for which combined transmission cannot be or does not need to be performed, the first network device may send indication information (which, for example, may be referred to as third indication information) to the second network device. The third indication information may be used to indicate information about a multicast service that needs to be independently scheduled by the second network device. For example, the third indication information indicates the second network device to independently schedule transmission of the second multicast service. After receiving the third indication information, the second network device may configure a resource for the second multicast service, to perform transmission of the second multicast service.

For technical effects brought by the second aspect or the implementations of the second aspect, refer to the descriptions of the technical effects of the first aspect or the implementations of the first aspect. Details are not described again.

According to a third aspect, a third communication method is provided. The method includes: A terminal device determines first multicast service configuration information, where the first multicast service configuration information includes one or more parameters associated with transmission of each of at least one multicast service, one of the parameters includes bandwidth part (BWP) indication information, and the BWP indication information indicates a BWP used by a corresponding multicast service. The terminal device receives the multicast service based on the first multicast service configuration information.

The method may be performed by a second communication apparatus. The second communication apparatus may be a communication device or a communication apparatus, for example, a chip system, that can support a function required by the communication device to implement the method. For example, the communication device is the terminal device.

With reference to the third aspect, in a possible implementation of the third aspect, the one of the parameters further includes any combination of one or more of the following:

configured grant information of the corresponding multicast service;

information about an RNTI corresponding to the corresponding multicast service;

a DRX parameter corresponding to the corresponding multicast service;

configuration information of a demodulation reference signal corresponding to the corresponding multicast service;

rate matching reference signal information, used to indicate a location that is of a reference signal and that needs to be excluded when the corresponding multicast service is received;

information about a scrambling sequence used by a PDSCH that carries the corresponding multicast service; or a service multiplexing identifier corresponding to the corresponding multicast service, where the service multiplexing identifier is used to indicate data of the corresponding multicast service.

With reference to the third aspect, in a possible implementation of the third aspect, the configured grant information includes any combination of one or more of the following:

time domain information for transmission of the corresponding multicast service;

frequency domain information for transmission of the corresponding multicast service;

the configuration information of the demodulation reference signal corresponding to the corresponding multicast service;

the rate matching reference signal information, used to indicate the location that is of the reference signal and that needs to be excluded when the corresponding multicast service is received;

information about an antenna port for transmission of the corresponding multicast service;

information about an MCS corresponding to the corresponding multicast service; or first indication information, used to indicate whether both the RNTI and the configured grant information need to be monitored.

With reference to the third aspect, in a possible implementation of the third aspect, that the terminal device receives the multicast service based on the multicast configuration information includes: the terminal device receives the multicast service based on the configured grant information; or the terminal device monitors, based on the information about the RNTI corresponding to the multicast service, a PDCCH used to schedule the multicast service, and when the PDCCH is detected, receives the multicast service based on the scheduling of the PDCCH; otherwise, receives the multicast service based on the configured grant information.

For example, the configured grant information of the first multicast service includes second indication information, and the terminal device determines that the second indication information indicates that the RNTI and the configured grant information do not both need to be monitored. This indicates that the second indication information indicates that only the configured grant information needs to be monitored. In this case, after receiving the configured grant information of the first multicast service, the terminal device may directly receive, based on the configured grant information, the PDSCH that carries the first multicast service, and does not need to monitor a G-RNTI corresponding to the first multicast service. Alternatively, if the configured grant information of the first multicast service includes second indication information, and the second indication information indicates that both the RNTI and the configured grant information need to be monitored, it indicates that the second indication information indicates that both the configured grant information and a G-RNTI that is corresponding to the first multicast service need to be monitored. In this case, after receiving the configured grant information of the first multicast service, the terminal device monitors, on a corresponding multicast service receiving occasion, for example, at a time point calculated based on the DRX parameter, a PDCCH that is based on the G-RNTI corresponding to the first multicast service. If the terminal device detects the PDCCH, the terminal device receives, based on scheduling of the PDCCH, the PDSCH that carries the first multicast service. If the terminal device does not detect the PDCCH, the terminal device receives, based on the configured grant information, the PDSCH that carries the first multicast service. Certainly, the terminal device may monitor both the G-RNTI and the PDSCH that is corresponding to the configured grant information, and service receiving is performed based on the G-RNTI or the PDSCH whose monitoring succeeds. This is not limited in this embodiment of this application.

With reference to the third aspect, in a possible implementation of the third aspect, the method further includes: The terminal device determines first multicast BWP configuration information, where the first multicast BWP configuration information includes information about at least one BWP, and information about each BWP includes one of the following or any combination of the following: frequency domain information, subcarrier spacing information, or cyclic prefix length information.

That the terminal device receives the multicast service based on the first multicast service configuration information includes: The terminal device receives the multicast service based on the first multicast service configuration information and the first multicast BWP configuration information.

With reference to the third aspect, in a possible implementation of the third aspect, the BWP indication information is a BWP number, and the BWP number is associated with one piece of information in the information about the at least one BWP.

With reference to the third aspect, in a possible implementation of the third aspect, the BWP indication information is used to indicate that the first multicast service uses an initial BWP; or the BWP indication information is information about a BWP used by the first multicast service.

With reference to the third aspect, in a possible implementation of the third aspect, the method further includes: The terminal device receives the first multicast service configuration information from a second network device; and/or the terminal device receives the first multicast BWP configuration information from the second network device.

With reference to the third aspect, in a possible implementation of the third aspect, that the terminal device receives the multicast service based on the first multicast service configuration information includes: The terminal device receives the multicast service from one or more cells based on the first multicast service configuration information.

Because a same parameter is used for a same service, a terminal device located at an edge of a cell is not limited to only being capable of receiving a service of the cell, and may also receive the same service sent in another cell, so that a receiving success rate of the terminal device can be improved. In addition, the same service sent in the another cell is no longer an interfering signal for the terminal device, so that reception quality of the terminal device is improved.

For technical effects brought by the third aspect or the implementations of the third aspect, refer to the descriptions of the technical effects of the first aspect or the implementations of the first aspect, or refer to the descriptions of the technical effects of the second aspect or the implementations of the second aspect. Details are not described again.

According to a fourth aspect, a first type of communication apparatus is provided. For example, the communication apparatus is the first communication apparatus described above. The communication apparatus is configured to perform the method according to any one of the first aspect or the possible implementations of the first aspect. Specifically, the communication apparatus may include modules configured to perform the method according to any one of the first aspect or the possible implementations of the first aspect. For example, the communication apparatus includes a processing module and a transceiver module. The transceiver module may be a functional module. The functional module can complete both a function of receiving information and a function of sending information. Alternatively, the transceiver module may be a general term of a sending module and a receiving module. The sending module is configured to complete a function of sending information, and the receiving module is configured to complete a function of receiving information. For example, the communication apparatus is a first network device. The processing module is configured to determine a first parameter for a first multicast service, where the first multicast service is associated with at least two cells, and the first parameter indicates a resource for transmission of the first multicast service.

The transceiver module is configured to send the first parameter to a second network device, where the second network device is associated with the at least two cells.

With reference to the fourth aspect, in a possible implementation of the fourth aspect, the first parameter includes any combination of one or more of the following:
configured grant information of the first multicast service;
information about an RNTI corresponding to the first multicast service;
a DRX parameter corresponding to the first multicast service;
configuration information of a demodulation reference signal corresponding to the first multicast service;
rate matching reference signal information, used to indicate a location that is of a reference signal and that needs to be excluded when the first multicast service is received;
information about a scrambling sequence used by a PDSCH that carries the first multicast service; or
a service multiplexing identifier corresponding to the first multicast service, where the service multiplexing identifier is used to indicate data of the first multicast service.

With reference to the fourth aspect, in a possible implementation of the fourth aspect, the configured grant information that is of the first multicast service and that is included in the first parameter includes any combination of one or more of the following:
time domain information for transmission of the first multicast service;
frequency domain information for transmission of the first multicast service;
the configuration information of the demodulation reference signal corresponding to the first multicast service;
the rate matching reference signal information, used to indicate the location that is of the reference signal and that needs to be excluded when the first multicast service is received;
information about an antenna port for transmission of the first multicast service;
information about an MCS corresponding to the first multicast service; or
first indication information, used to indicate whether both the RNTI and the configured grant information need to be monitored.

With reference to the fourth aspect, in a possible implementation of the fourth aspect, the processing module is further configured to determine second multicast BWP configuration information, where the second multicast BWP configuration information includes information about at least one BWP, and information about each BWP includes any combination of one or more of the following: frequency domain information, subcarrier spacing information, or cyclic prefix length information; and the transceiver module is further configured to send the second multicast BWP configuration information to the second network device.

With reference to the fourth aspect, in a possible implementation of the fourth aspect, the first parameter further includes BWP indication information; and the BWP indication information is a BWP number, and the BWP number is associated with one piece of information in the information about the at least one BWP.

With reference to the fourth aspect, in a possible implementation of the fourth aspect, the first parameter further includes BWP indication information, where the BWP indication information is used to indicate that the first multicast service uses an initial BWP; or the BWP indication information is information about a BWP used by the first multicast service.

With reference to the fourth aspect, in a possible implementation of the fourth aspect, the processing module is further configured to determine to reserve at least one RNTI for a multicast service; and the transceiver module is further configured to send information about the at least one RNTI to the second network device, to indicate the second network device to reserve the at least one RNTI.

With reference to the fourth aspect, in a possible implementation of the fourth aspect, the processing module is further configured to determine the at least two cells based on information about a cell in which a terminal device that is to receive the first multicast service is located, where the first network device obtains, based on information received from a core network device, the information about the cell in which the terminal device that is to receive the first multicast service is located, or the first network device obtains, based on information reported by the terminal device, the information about the cell in which the terminal device that is to receive the first multicast service is located.

For technical effects brought by the fourth aspect or the implementations of the fourth aspect, refer to the descriptions of the technical effects of the first aspect or the implementations of the first aspect. Details are not described again.

According to a fifth aspect, a second type of communication apparatus is provided. For example, the communication apparatus is the second communication apparatus described above. The communication apparatus is configured to perform the method according to any one of the second aspect or the possible implementations of the second aspect. Specifically, the communication apparatus may include modules configured to perform the method according to any one of the second aspect or the possible implementations of the second aspect. For example, the communication apparatus includes a processing module and a transceiver module. The transceiver module may be a functional module. The functional module can complete both a function of receiving information and a function of sending information. Alternatively, the transceiver module may be a general term of a sending module and a receiving module. The sending module is configured to complete a function of sending information, and the receiving module is configured to complete a function of receiving information. For example, the communication apparatus is a second network device. The processing module is configured to determine first multicast service configuration information, where the first multicast service configuration information includes one or more parameters associated with transmission of each of at least one multicast service, one of the parameters includes BWP indication information, and the BWP indication information indicates a BWP used by a corresponding multicast service.

The transceiver module is configured to send the first multicast service configuration information to a terminal device.

With reference to the fifth aspect, in a possible implementation of the fifth aspect, the one of the parameters further includes any combination of one or more of the following:

configured grant information of the corresponding multicast service;

information about an RNTI corresponding to the corresponding multicast service;

a DRX parameter corresponding to the corresponding multicast service;

configuration information of a demodulation reference signal corresponding to the corresponding multicast service;

rate matching reference signal information, used to indicate a location that is of a reference signal and that needs to be excluded when the corresponding multicast service is received;

information about a scrambling sequence used by a PDSCH that carries the corresponding multicast service; or a service multiplexing identifier corresponding to the corresponding multicast service, where the service multiplexing identifier is used to indicate data of the corresponding multicast service.

With reference to the fifth aspect, in a possible implementation of the fifth aspect, the configured grant information includes any combination of one or more of the following:

time domain information for transmission of the corresponding multicast service;

frequency domain information for transmission of the corresponding multicast service;

the configuration information of the demodulation reference signal corresponding to the corresponding multicast service;

the rate matching reference signal information, used to indicate the location that is of the reference signal and that needs to be excluded when the corresponding multicast service is received;

information about an antenna port for transmission of the corresponding multicast service;

information about an MCS corresponding to the corresponding multicast service; or first indication information, used to indicate whether both the RNTI and the configured grant information need to be monitored.

With reference to the fifth aspect, in a possible implementation of the fifth aspect, the processing module is further configured to determine first multicast BWP configuration information, where the first multicast BWP configuration information includes information about at least one BWP, and information about each BWP includes any combination of one or more of the following: frequency domain information, subcarrier spacing information, or cyclic prefix length information; and the transceiver module is further configured to send the first multicast BWP configuration information to the terminal device.

With reference to the fifth aspect, in a possible implementation of the fifth aspect, the BWP indication information is a BWP number, and the BWP number is associated with one piece of information in the information about the at least one BWP.

With reference to the fifth aspect, in a possible implementation of the fifth aspect, the BWP indication information is used to indicate that the first multicast service uses an initial BWP; or the BWP indication information is information about a BWP used by the first multicast service.

With reference to the fifth aspect, in a possible implementation of the fifth aspect, the transceiver module is further configured to: receive second multicast service configuration information from a first network device; and/or receive second multicast BWP configuration information from the first network device.

With reference to the fifth aspect, in a possible implementation of the fifth aspect, the transceiver module is further configured to: receive information about at least one RNTI from the first network device, and determine not to use the at least one RNTI when configuring an RNTI for a service.

With reference to the fifth aspect, in a possible implementation of the fifth aspect, the transceiver module is further configured to receive indication information from the first network device, where the indication information is used to indicate the second network device to independently schedule transmission of a second multicast service; and the processing module is further configured to: configure a resource to perform transmission of the second multicast service, and add information about the configured resource to the first multicast service configuration information.

For technical effects brought by the fifth aspect or the implementations of the fifth aspect, refer to the descriptions of the technical effects of the second aspect or the implementations of the second aspect. Details are not described again.

According to a sixth aspect, a third type of communication apparatus is provided. For example, the communication apparatus is the third communication apparatus described above. The communication apparatus is configured to perform the method according to any one of the third aspect or the possible implementations of the third aspect. Specifically, the communication apparatus may include modules configured to perform the method according to any one of the third aspect or the possible implementations of the third aspect. For example, the communication apparatus includes a processing module and a transceiver module. The transceiver module may be a functional module. The functional module can complete both a function of receiving information and a function of sending information. Alternatively, the transceiver module may be a general term of a sending module and a receiving module. The sending module is configured to complete a function of sending information, and the receiving module is configured to complete a function of receiving information. For example, the communication apparatus is a terminal device. The processing module is configured to determine first multicast service configuration information, where the first multicast service configuration information includes one or more parameters associated with transmission of each of at least one multicast service, one of the parameters includes bandwidth part (BWP) indication information, and the BWP indication information indicates a BWP used by a corresponding multicast service.

The transceiver module is configured to receive the multicast service based on the first multicast service configuration information.

With reference to the sixth aspect, in a possible implementation of the sixth aspect, the one of the parameters further includes any combination of one or more of the following:

configured grant information of the corresponding multicast service;

information about an RNTI corresponding to the corresponding multicast service;

a DRX parameter corresponding to the corresponding multicast service;

configuration information of a demodulation reference signal corresponding to the corresponding multicast service;

rate matching reference signal information, used to indicate a location that is of a reference signal and that needs to be excluded when the corresponding multicast service is received;

information about a scrambling sequence used by a PDSCH that carries the corresponding multicast service; or a service multiplexing identifier corresponding to the corresponding multicast service, where the service multiplexing identifier is used to indicate data of the corresponding multicast service.

With reference to the sixth aspect, in a possible implementation of the sixth aspect, the configured grant information includes any combination of one or more of the following: time domain information for transmission of the corresponding multicast service; frequency domain information for transmission of the corresponding multicast service; the configuration information of the demodulation reference signal corresponding to the corresponding multicast service; the rate matching reference signal information, used to indicate the location that is of the reference signal and that needs to be excluded when the corresponding multicast service is received; information about an antenna port for transmission of the corresponding multicast service; information about an MCS corresponding to the corresponding multicast service; or first indication information, used to indicate whether both the RNTI and the configured grant information need to be monitored.

With reference to the sixth aspect, in a possible implementation of the sixth aspect, the transceiver module is configured to receive the multicast service based on the multicast configuration information in the following manner: receiving the multicast service based on the configured grant information; or monitoring, based on the information about the RNTI corresponding to the multicast service, a PDCCH used to schedule the multicast service, and when the PDCCH is detected, receiving the multicast service based on the scheduling of the PDCCH; otherwise, receiving the multicast service based on the configured grant information.

With reference to the sixth aspect, in a possible implementation of the sixth aspect, the processing module is further configured to determine first multicast BWP configuration information, where the first multicast BWP configuration information includes information about at least one BWP, and information about each BWP includes any combination of one or more of the following: frequency domain information, subcarrier spacing information, or cyclic prefix length information; and the transceiver module is configured to receive the multicast service based on the first multicast service configuration information in the following manner: receiving the multicast service based on the first multicast service configuration information and the first multicast BWP configuration information.

With reference to the sixth aspect, in a possible implementation of the sixth aspect, the BWP indication information is a BWP number, and the BWP number is associated with one piece of information in the information about the at least one BWP.

With reference to the sixth aspect, in a possible implementation of the sixth aspect, the BWP indication information is used to indicate that the first multicast service uses an initial BWP; or the BWP indication information is information about a BWP used by the first multicast service.

With reference to the sixth aspect, in a possible implementation of the sixth aspect, the transceiver module is further configured to: receive the first multicast service configuration information from a second network device; and/or receive the first multicast BWP configuration information from the second network device.

With reference to the sixth aspect, in a possible implementation of the sixth aspect, the transceiver module is configured to receive the multicast service based on the first multicast service configuration information in the following manner: receiving the multicast service from one or more cells based on the first multicast service configuration information.

For technical effects brought by the sixth aspect or the implementations of the sixth aspect, refer to the descriptions of the technical effects of the third aspect or the implementations of the third aspect. Details are not described again.

According to a seventh aspect, a fourth type of communication apparatus is provided. For example, the communication apparatus is the first communication apparatus described above. The communication apparatus includes a processor and a memory, and optionally, further includes a transceiver. The processor, the memory, and the transceiver are configured to implement the method according to the first aspect or the possible designs of the first aspect. For example, the communication apparatus is a chip disposed in a communication device. For example, the communication device is a first network device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to send and/or receive information through the radio frequency transceiver component. The processor is configured to determine a first parameter for a first multicast service, where the first multicast service is associated with at least two cells, and the first parameter indicates a resource for transmission of the first multicast service.

The transceiver is configured to send the first parameter to a second network device, where the second network device is associated with the at least two cells.

With reference to the seventh aspect, in a possible implementation of the seventh aspect, the first parameter includes any combination of one or more of the following:

configured grant information of the first multicast service;

information about an RNTI corresponding to the first multicast service;

a DRX parameter corresponding to the first multicast service;

configuration information of a demodulation reference signal corresponding to the first multicast service;

rate matching reference signal information, used to indicate a location that is of a reference signal and that needs to be excluded when the first multicast service is received;

information about a scrambling sequence used by a PDSCH that carries the first multicast service; or a service multiplexing identifier corresponding to the first multicast service, where the service multiplexing identifier is used to indicate data of the first multicast service.

With reference to the seventh aspect, in a possible implementation of the seventh aspect, the configured grant information that is of the first multicast service and that is included in the first parameter includes any combination of one or more of the following:

time domain information for transmission of the first multicast service;

frequency domain information for transmission of the first multicast service;

the configuration information of the demodulation reference signal corresponding to the first multicast service;

the rate matching reference signal information, used to indicate the location that is of the reference signal and that needs to be excluded when the first multicast service is received;

information about an antenna port for transmission of the first multicast service;

information about an MCS corresponding to the first multicast service; or first indication information, used to indicate whether both the RNTI and the configured grant information need to be monitored.

With reference to the seventh aspect, in a possible implementation of the seventh aspect, the processor is further configured to determine second multicast BWP configuration information, where the second multicast BWP configuration information includes information about at least one BWP, and information about each BWP includes any combination of one or more of the following: frequency domain information, subcarrier spacing information, or cyclic prefix length information; and the transceiver is further configured to send the second multicast BWP configuration information to the second network device.

With reference to the seventh aspect, in a possible implementation of the seventh aspect, the first parameter further includes BWP indication information; and the BWP indication information is a BWP number, and the BWP number is associated with one piece of information in the information about the at least one BWP.

With reference to the seventh aspect, in a possible implementation of the seventh aspect, the first parameter further includes BWP indication information, where the BWP indication information is used to indicate that the first multicast service uses an initial BWP; or the BWP indication information is information about a BWP used by the first multicast service.

With reference to the seventh aspect, in a possible implementation of the seventh aspect, the processor is further configured to determine to reserve at least one RNTI for a multicast service; and the transceiver is further configured to send information about the at least one RNTI to the second network device, to indicate the second network device to reserve the at least one RNTI.

With reference to the seventh aspect, in a possible implementation of the seventh aspect, the processor is further configured to determine the at least two cells based on information about a cell in which a terminal device that is to receive the first multicast service is located, where the first network device obtains, based on information received from a core network device, the information about the cell in which the terminal device that is to receive the first multicast service is located, or the first network device obtains, based on information reported by the terminal device, the information about the cell in which the terminal device that is to receive the first multicast service is located.

For technical effects brought by the seventh aspect or the implementations of the seventh aspect, refer to the descriptions of the technical effects of the first aspect or the implementations of the first aspect. Details are not described again.

According to an eighth aspect, a fifth type of communication apparatus is provided. For example, the communication apparatus is the second communication apparatus described above. The communication apparatus includes a processor and a memory, and optionally, further includes a transceiver. The processor, the memory, and the transceiver are configured to implement the method according to the second aspect or the possible designs of the second aspect. For example, the communication apparatus is a chip disposed in a communication device. For example, the communication device is a second network device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to send and/or receive information through the radio frequency transceiver component. The processor is configured to determine first multicast service configuration information, where the first multicast service configuration information includes one or more parameters associated with transmission of each of at least one multicast service, one of the parameters includes BWP indication information, and the BWP indication information indicates a BWP used by a corresponding multicast service.

The transceiver is configured to send the first multicast service configuration information to a terminal device.

With reference to the eighth aspect, in a possible implementation of the eighth aspect, the one of the parameters further includes any combination of one or more of the following:

configured grant information of the corresponding multicast service;

information about an RNTI corresponding to the corresponding multicast service;

a DRX parameter corresponding to the corresponding multicast service;

configuration information of a demodulation reference signal corresponding to the corresponding multicast service;

rate matching reference signal information, used to indicate a location that is of a reference signal and that needs to be excluded when the corresponding multicast service is received;

information about a scrambling sequence used by a PDSCH that carries the corresponding multicast service; or a service multiplexing identifier corresponding to the corresponding multicast service, where the service multiplexing identifier is used to indicate data of the corresponding multicast service.

With reference to the eighth aspect, in a possible implementation of the eighth aspect, the configured grant information includes any combination of one or more of the following:

time domain information for transmission of the corresponding multicast service;

frequency domain information for transmission of the corresponding multicast service;

the configuration information of the demodulation reference signal corresponding to the corresponding multicast service;

the rate matching reference signal information, used to indicate the location that is of the reference signal and that needs to be excluded when the corresponding multicast service is received;

information about an antenna port for transmission of the corresponding multicast service;

information about an MCS corresponding to the corresponding multicast service; or first indication information, used to indicate whether both the RNTI and the configured grant information need to be monitored.

With reference to the eighth aspect, in a possible implementation of the eighth aspect, the processor is further configured to determine first multicast BWP configuration information, where the first multicast BWP configuration information includes information about at least one BWP, and information about each BWP includes any combination of one or more of the following: frequency domain information, subcarrier spacing information, or cyclic prefix length information; and the transceiver is further configured to send the first multicast BWP configuration information to the terminal device.

With reference to the eighth aspect, in a possible implementation of the eighth aspect, the BWP indication information is a BWP number, and the BWP number is associated with one piece of information in the information about the at least one BWP.

With reference to the eighth aspect, in a possible implementation of the eighth aspect, the BWP indication information is used to indicate that the first multicast service uses an initial BWP; or the BWP indication information is information about a BWP used by the first multicast service.

With reference to the eighth aspect, in a possible implementation of the eighth aspect, the transceiver is further configured to: receive second multicast service configuration information from a first network device; and/or receive second multicast BWP configuration information from the first network device.

With reference to the eighth aspect, in a possible implementation of the eighth aspect, the transceiver is further configured to: receive information about at least one RNTI from the first network device, and determine not to use the at least one RNTI when configuring an RNTI for a service.

With reference to the eighth aspect, in a possible implementation of the eighth aspect, the transceiver is further configured to receive indication information from the first network device, where the indication information is used to indicate the second network device to independently schedule transmission of a second multicast service; and the processor is further configured to: configure a resource to perform transmission of the second multicast service, and add information about the configured resource to the first multicast service configuration information.

For technical effects brought by the eighth aspect or the implementations of the eighth aspect, refer to the descriptions of the technical effects of the second aspect or the implementations of the second aspect. Details are not described again.

According to a ninth aspect, a sixth type of communication apparatus is provided. For example, the communication apparatus is the third communication apparatus described above. The communication apparatus includes a processor and a memory, and optionally, further includes a transceiver. The processor, the memory, and the transceiver are configured to implement the method according to the third aspect or the possible designs of the third aspect. For example, the communication apparatus is a chip disposed in a communication device. For example, the communication device is a terminal device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to send and/or receive information through the radio frequency transceiver component. The processor is configured to determine first multicast service configuration information, where the first multicast service configuration information includes one or more parameters associated with transmission of each of at least one multicast service, one of the parameters includes BWP indication information, and the BWP indication information indicates a BWP used by a corresponding multicast service.

The transceiver is configured to receive the multicast service based on the first multicast service configuration information.

With reference to the ninth aspect, in a possible implementation of the ninth aspect, the one of the parameters further includes any combination of one or more of the following:

configured grant information of the corresponding multicast service;

information about an RNTI corresponding to the corresponding multicast service;

a DRX parameter corresponding to the corresponding multicast service;

configuration information of a demodulation reference signal corresponding to the corresponding multicast service;

rate matching reference signal information, used to indicate a location that is of a reference signal and that needs to be excluded when the corresponding multicast service is received;

information about a scrambling sequence used by a PDSCH that carries the corresponding multicast service; or a service multiplexing identifier corresponding to the corresponding multicast service, where the service multiplexing identifier is used to indicate data of the corresponding multicast service.

With reference to the ninth aspect, in a possible implementation of the ninth aspect, the configured grant information includes any combination of one or more of the following:

time domain information for transmission of the corresponding multicast service;

frequency domain information for transmission of the corresponding multicast service;

the configuration information of the demodulation reference signal corresponding to the corresponding multicast service;

the rate matching reference signal information, used to indicate the location that is of the reference signal and that needs to be excluded when the corresponding multicast service is received;

information about an antenna port for transmission of the corresponding multicast service;

information about an MCS corresponding to the corresponding multicast service; or first indication information, used to indicate whether both the RNTI and the configured grant information need to be monitored.

With reference to the ninth aspect, in a possible implementation of the ninth aspect, the transceiver is configured to receive the multicast service based on the multicast configuration information in the following manner: receiving the multicast service based on the configured grant information; or monitoring, based on the information about the RNTI corresponding to the multicast service, a PDCCH used to schedule the multicast service, and when the PDCCH is detected, receiving the multicast service based on the scheduling of the PDCCH; otherwise, receiving the multicast service based on the configured grant information.

With reference to the ninth aspect, in a possible implementation of the ninth aspect, the processor is further configured to determine first multicast BWP configuration information, where the first multicast BWP configuration information includes information about at least one BWP, and information about each BWP includes any combination of one or more of the following: frequency domain information, subcarrier spacing information, or cyclic prefix length information; and the transceiver is configured to receive the multicast service based on the first multicast service configuration information in the following manner: receiving the multicast service based on the first multicast service configuration information and the first multicast BWP configuration information.

With reference to the ninth aspect, in a possible implementation of the ninth aspect, the BWP indication information is a BWP number, and the BWP number is associated with one piece of information in the information about the at least one BWP.

With reference to the ninth aspect, in a possible implementation of the ninth aspect, the BWP indication information is used to indicate that the first multicast service uses an initial BWP; or the BWP indication information is information about a BWP used by the first multicast service.

With reference to the ninth aspect, in a possible implementation of the ninth aspect, the transceiver is further configured to: receive the first multicast service configuration information from a second network device; and/or receive the first multicast BWP configuration information from the second network device.

With reference to the ninth aspect, in a possible implementation of the ninth aspect, the transceiver is configured to receive the multicast service based on the first multicast service configuration information in the following manner: receiving the multicast service from one or more cells based on the first multicast service configuration information.

For technical effects brought by the ninth aspect or the implementations of the ninth aspect, refer to the descriptions of the technical effects of the third aspect or the implementations of the third aspect. Details are not described again.

According to a tenth aspect, a seventh type of communication apparatus is provided. The communication apparatus may be the first communication apparatus in the foregoing method designs. For example, the communication apparatus is a chip disposed in a communication device. For example, the communication device is a first network device. The communication apparatus includes: a memory, configured to store computer-executable program code; and a processor, where the processor is coupled to the memory. The program code stored in the memory includes instructions. When the processor executes the instructions, the seventh type of communication apparatus is enabled to perform the method in any one of the first aspect or the possible implementations of the first aspect.

The seventh type of communication apparatus may further include a communication interface. The communication interface may be a transceiver in the first network device, for example, implemented by using an antenna, a feeder, and a codec in the communication apparatus. Alternatively, if the seventh type of communication apparatus is the chip disposed in the first network device, the communication interface may be an input/output interface in the chip, for example, an input/output pin.

According to an eleventh aspect, an eighth type of communication apparatus is provided. The communication apparatus may be the second communication apparatus in the foregoing method designs. For example, the communication apparatus is a chip disposed in a communication device. For example, the communication device is a second network device. The communication apparatus includes: a memory, configured to store computer-executable program code; and a processor, where the processor is coupled to the memory. The program code stored in the memory includes instructions. When the processor executes the instructions, the eighth type of communication apparatus is enabled to perform the method in any one of the second aspect or the possible implementations of the second aspect.

The eighth type of communication apparatus may further include a communication interface. The communication interface may be a transceiver in the second network device, for example, implemented by using an antenna, a feeder, and a codec in the communication apparatus. Alternatively, if the eighth type of communication apparatus is the chip disposed in the second network device, the communication interface may be an input/output interface in the chip, for example, an input/output pin.

According to a twelfth aspect, a ninth type of communication apparatus is provided. The communication apparatus may be the third communication apparatus in the foregoing method designs. For example, the communication apparatus is a chip disposed in a communication device. For example, the communication device is a terminal device. The communication apparatus includes: a memory, configured to store computer-executable program code; and a processor, where the processor is coupled to the memory. The program code stored in the memory includes instructions. When the processor executes the instructions, the ninth type of communication apparatus is enabled to perform the method in any one of the third aspect or the possible implementations of the third aspect.

The ninth type of communication apparatus may further include a communication interface. The communication interface may be a transceiver in the terminal device, for example, implemented by using an antenna, a feeder, and a codec in the communication apparatus. Alternatively, if the ninth type of communication apparatus is the chip disposed in the terminal device, the communication interface may be an input/output interface in the chip, for example, an input/output pin.

According to a thirteenth aspect, a communication system is provided. The communication system may include the first type of communication apparatus according to the fourth aspect, the fourth type of communication apparatus according to the seventh aspect, or the seventh type of communication apparatus according to the tenth aspect, and include the second type of communication apparatus according to the fifth aspect, the fifth communication apparatus according to the eighth aspect, or the eighth type of communication apparatus according to the eleventh aspect.

With reference to the thirteenth aspect, in a possible implementation of the thirteenth aspect, the communication system further includes the third type of communication apparatus according to the sixth aspect, the sixth type communication apparatus according to the ninth aspect, or the ninth type of communication apparatus according to the twelfth aspect.

A fourteenth aspect provides a computer-readable storage medium. The computer-readable storage medium stores instructions. When the instructions are run on a computer, the computer is enabled to perform the method according to the first aspect or any possible design of the first aspect.

A fifteenth aspect provides a computer-readable storage medium. The computer-readable storage medium stores instructions. When the instructions are run on a computer, the computer is enabled to perform the method according to the second aspect or any possible design of the second aspect.

A sixteenth aspect provides a computer-readable storage medium. The computer-readable storage medium stores instructions. When the instructions are run on a computer, the computer is enabled to perform the method according to the third aspect or any possible design of the third aspect.

A seventeenth aspect provides a computer program product including instructions. The computer program product stores the instructions. When the computer program product runs on a computer, the computer is enabled to perform the method according to the first aspect or any possible design of the first aspect.

An eighteenth aspect provides a computer program product including instructions. The computer program product stores the instructions. When the computer program product runs on a computer, the computer is enabled to perform the method according to the second aspect or any possible design of the second aspect.

A nineteenth aspect provides a computer program product including instructions. The computer program product stores the instructions. When the computer program product runs on a computer, the computer is enabled to perform the method according to the third aspect or any possible design of the third aspect.

In the embodiments of this application, because a same parameter is used for a same multicast service, a terminal device located at an edge of a cell is not limited to only being capable of receiving a multicast service of the cell, and may also receive the same multicast service sent in another cell, so that a receiving success rate of the terminal device can be improved. In addition, the same multicast service sent in the another cell is no longer an interfering signal for the terminal device, so that reception quality of the terminal device is improved.

DETAILED DESCRIPTION OF ILLUSTRATIVE EMBODIMENTS

Figure 1:
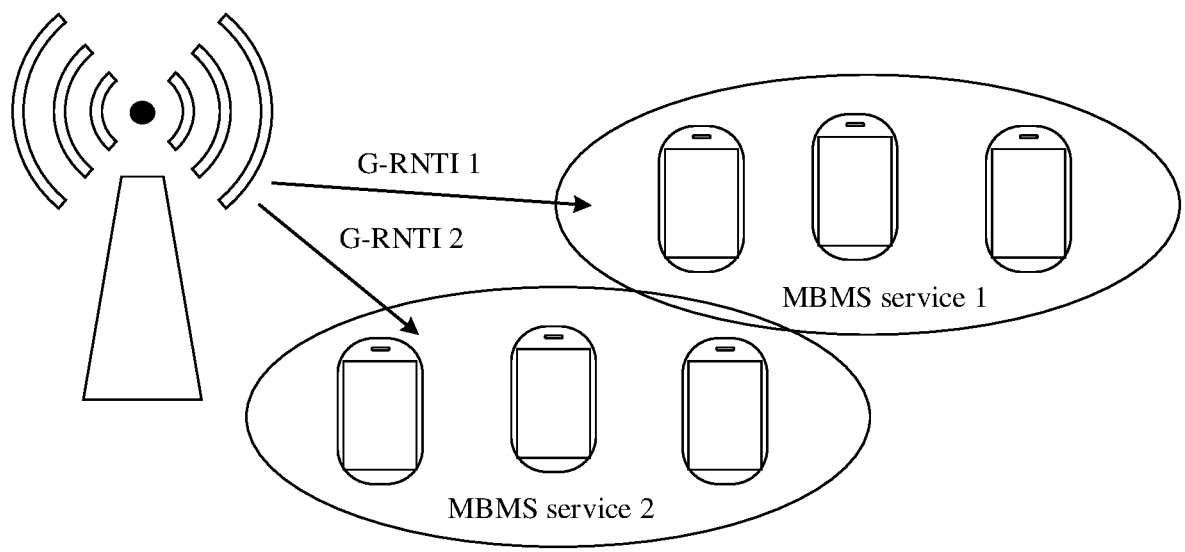
FIG. 1 is a schematic diagram of service transmission in SC-PTM.

To make objectives, technical solutions, and advantages of the embodiments of this application clearer, the following further describes the embodiments of this application in detail with reference to the accompanying drawings.

The following describes some terms in the embodiments of this application, to facilitate understanding for a person skilled in the art.

(1) A terminal device may include a device that provides a user with voice and/or data connectivity, for example, may include a handheld device with a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) communication terminal device, a vehicle-to-everything (V2X) terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus, and the like. For example, the terminal is a personal communications service (PCS) phone, a cordless telephone set, a session initiation protocol (SIP) phone, a wireless local loop (WLL) station, or a personal digital assistant (PDA). The terminal further includes a limited device, for example, a device with low power consumption, a device with a limited storage capability, or a device with a limited computing capability. For example, the terminal includes an information sensing device such as a barcode, a radio frequency identification (RFID) device, a sensor, a global positioning system (GPS), or a laser scanner.

By way of example and not limitation, the terminal device in the embodiments of this application may alternatively be a wearable device. The wearable device may also be referred to as a wearable intelligent device, an intelligent wearable device, or the like, and is a general term for wearable devices that are developed by using a wearable technology to perform intelligent design on daily wear, for example, glasses, gloves, a watch, clothes, and shoes. The wearable device is a portable device that is directly worn on a body or integrated into clothes or an accessory of the user. The wearable device is not only a hardware device, but is used to implement a powerful function through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be considered as vehicle-mounted terminal devices. For example, the vehicle-mounted terminal device is also referred to as an on board unit (OBU).

(2) A network device includes, for example, an access network (AN) device, for example, a base station (for example, an access point), and may be a device that is in an access network and that communicates with a wireless terminal device through one or more cells on an air interface, or, for example, a multicast control function MCF) module, or, for example, an access network device in a vehicle-to-everything (V2X) technology, which is a road side unit (RSU).

The base station may be configured to perform mutual conversion between a received over-the-air frame and a received internet protocol (IP) packet, and serve as a router between the terminal device and the other parts of the access network, where the other parts of the access network may include an IP network. The base station may further coordinate attribute management of the air interface. For example, the base station may include an evolved NodeB (NodeB or eNB or e-NodeB, evolved NodeB) in a long term evolution (long term evolution, LTE) system or long term evolution-advanced (LTE-A), may include a next generation NodeB (gNB) in a 5th generation (5G) new radio (NR) system, or may include a centralized unit (CU) and a distributed unit (DU) in a cloud access network (Cloud RAN) system. This is not limited in the embodiments of this application.

The MCF may schedule a multicast service, control a multicast service, or the like. The MCF may be independently deployed as a device. For example, the MCF is implemented by using a base station, or may be integrated into another network device as a functional module, for example, integrated into a base station. The MCF may be in a one-to-one correspondence with the base station. For example, one base station corresponds to one MCF. If the MCF is independently deployed as a device, one base station corresponds to one independently deployed MCF. If the MCF is integrated into the base station as a functional module, one MCF is integrated into one base station. Alternatively, a plurality of base stations may correspond to only one MCF. If the MCF is independently deployed as one device, the plurality of base stations correspond to one independently deployed MCF. If the MCF is integrated into the base station as a functional module, the MCF needs to be integrated into only one of the plurality of base stations.

The RSU may be a fixed infrastructure entity that supports a V2X application, and may exchange a message with another entity that supports the V2X application.

Certainly, the network device may further include a core network device. The core network device in this specification may include a serving support node of a general packet radio service (GPRS) (SGSN), or a gateway support node of the GPRS (GGSN), or the SGSN and the GGSN in 3rd generation (3G), or may include a mobility management entity (MME), or a serving gateway (S-GW), or the MME and the S-GW in a 4G LTE system, or may include an access and mobility management function (AMF), a session management function (SMF), or a user plane function (UPF) in 5G.

The technical solutions provided in the embodiments of this application mainly relate to an access network device. Therefore, unless specially stated, the "network device" described below is an access network device.

(3) A multimedia broadcast multicast service (MBMS) is usually provided in broadcast mode. For example, in the LTE system, each cell may have several subframes to send an MBMS service, and all terminal devices may receive the MBMS service by receiving the several subframes. The terminal device may receive the MBMS service in an idle mode or a connected mode, and the base station may not necessarily know which terminal devices are receiving the MBMS service. Certainly, for a terminal device that receives the MBMS service in the connected mode, the base station may learn, by initiating a counting (counting) process, which terminal devices in the connected mode are receiving the MBMS service or are interested in receiving the MBMS service. The counting process means that the base station may send a message to query whether the terminal device is receiving or is interested in receiving the MBMS service, and after receiving the message, the terminal device that has received the MBMS service, is receiving the MBMS service, or is interested in receiving the MBMS service may send a response to the base station, so that the base station can learn which terminal devices are receiving the MBMS service or are interested in receiving the MBMS service.

In the LTE system, transmission of the MBMS service is usually performed by using an MBSFN technology or an SC-PTM technology.

(4) A multimedia broadcast multicast service single frequency network (MBSFN) requires that in all cells in an area, transmission of a same signal be performed by using a same waveform simultaneously. This may also be understood as that cells in which transmission of a same signal is performed by using a same waveform simultaneously may form an area. In addition, a plurality of physical multicast channels (PMCHs) may be configured in this area, and each PMCH may carry an MBMS service. In this way, the terminal device can consider a plurality of MBSFN cells as one large cell, so that the terminal device not only does not suffer from inter-cell interference caused by transmission performed in a neighboring cell, but also benefits from superimposition of signals from the plurality of MBSFN cells.

However, in the MBSFN technology, a corresponding area needs to be designed, and the area cannot be changed after being determined. In addition, a dedicated subframe also needs to be used for transmission.

(5) SC-PTM is a multicast transmission technology. In the LTE system, a multicast technology that is first introduced is an evolved multimedia broadcast/multicast service (eM-BMS). In the eMBMS technology, same content requires to be sent simultaneously in all cells in an area. Even if terminal devices are distributed only in some cells in the area, and there is no terminal device in the other cells that needs to receive the content, the content needs to be sent simultaneously in all the cells. It can be learned that transmission efficiency of an eMBMS technology is relatively low. Therefore, the 3rd generation partnership project (3GPP) standards further put forward the SC-PTM technology. In the SC-PTM technology, in each cell, an MBMS service is simultaneously scheduled to a plurality of terminal devices by using a global system for mobile communications/enhanced data rates for GSM evolution radio access network radio network temporary identifier (G-RNTI), and one G-RNTI may be associated with one MBMS service. In addition, in an area, a service needs to be sent only in a cell that includes a user, and no service needs to be sent in a cell that does not include a user. In this way, an air interface resource is saved. FIG. 1 is a schematic diagram of service transmission in SC-PTM. It can be seen that, a base station uses a G-RNTI 1 to perform transmission of an MBMS service 1, and uses a G-RNTI 2 to perform transmission of an MBMS service 2.

In the SC-PTM, service transmission is performed on a physical downlink shared channel (PDSCH). Different from a PDSCH that carries a unicast service, a PDSCH that carries a group cast (or referred to as multicast) service is referred to as a group cast PDSCH (or multicast PDSCH). In an SC-PTM transmission process, a base station sends, to a group of terminal devices in a cell, downlink control information (DCI) carried on a physical downlink control channel (PDCCH), and the group of terminal devices receive a group cast PDSCH based on scheduling information included in the DCI. For SC-PTM transmission, the base station may configure a DCI format as a DCI format 1A. Usually, in the DCI format 1A, consecutive resource blocks (RBs) are scheduled.

Two logical channels are introduced in the SC-PTM: a single cell multicast control channel (SC-MCCH) and a single cell multicast transport channel (SC-MTCH). The SC-MCCH is used for transmission of control information, and the control information includes, for example, configuration information of the SC-MTCH, for example, a G-RNTI and a discontinuous reception (DRX) parameter that correspond to the SC-MTCH. The SC-MCCH is sent periodically.

Figure 2:
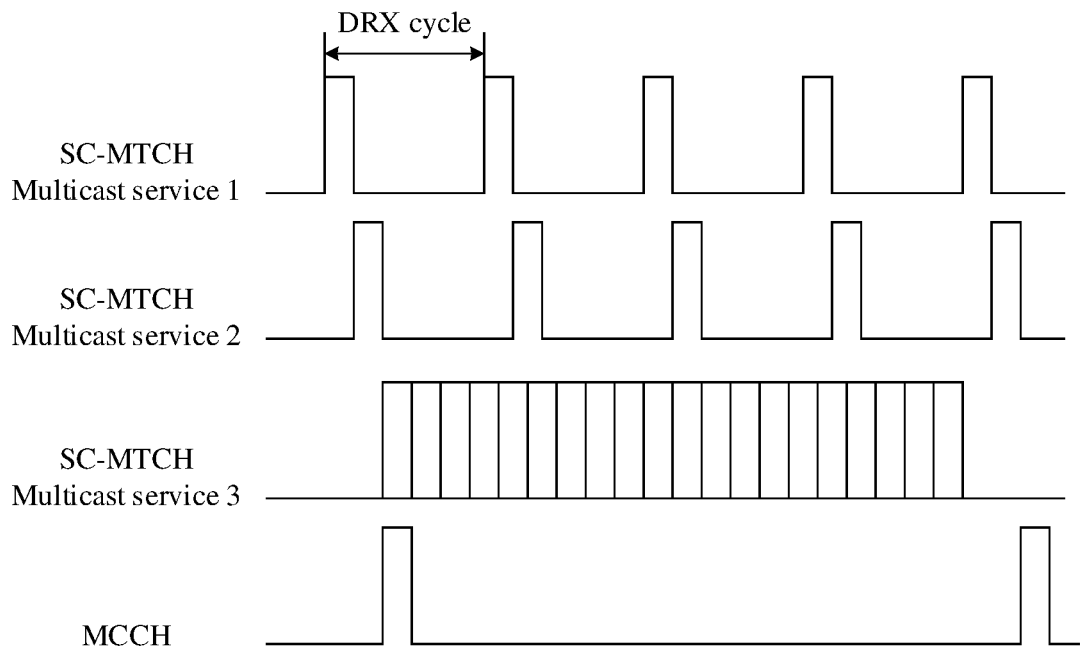
FIG. 2 is a schematic diagram of service transmission on an SC-MTCH.

The SC-MTCH is used for transmission of a service, and each multicast service corresponds to one SC-MTCH. Continuous transmission may be performed on the SC-MTCH. For example, refer to FIG. 2. Continuous transmission of a multicast service 3 in FIG. 2 is performed on the SC-MTCH. Discontinuous transmission may also be configured for the SC-MTCH. Still refer to FIG. 2. Discontinuous transmission of the multicast service 1 and the multicast service 2 in FIG. 2 is performed on respective SC-MTCH channels. In addition, when discontinuous transmission is performed on two SC-MTCH channels, corresponding discontinuous transmission parameters may be the same or different. For example, in FIG. 2, a discontinuous transmission parameter for transmission of the service 1 is different from a discontinuous transmission parameter for transmission of the service 2.

(6) A bandwidth part (BWP) may be considered as a part of a bandwidth of a cell, and each terminal device may be configured to work on several BWPs. However, for a terminal device, only one BWP is active at any moment. Main parameters of the BWP include at least one of bandwidth, a frequency domain location, a subcarrier spacing (SCS), a cyclic prefix (CP) length, configuration information related to a control-resource set (control-resource set, CORESET), or configuration information related to a PDSCH.

For one cell, there is at least one initial (initial) BWP. All common information such as a broadcast message and a paging message in the cell is sent on an initial BWP, and a terminal device in an idle mode may receive, on the initial BWP, common information such as a broadcast message and a cyclic message. After the terminal device enters a connected mode, a base station may further configure some dedicated BWPs for the terminal device.

(7) "At least one" means one or more, and "a plurality of" means two or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of the items, including any combination of one item (piece) or a plurality of items (pieces). For example, at least one of a, b, or c may represent: a, b, c, a and b, a and c, b and c, or a, b, and c, where a, b, and c may be singular or plural.

In addition, unless otherwise stated, in the embodiments of this application, ordinal numbers such as "first" and "second" are used to distinguish between a plurality of objects, and are not intended to limit an order, a time sequence, a priority, or importance of the plurality of objects. For example, a first multicast service and a second multicast service are merely intended to distinguish between different multicast services, but do not indicate that the two multicast services are different in content, priorities, sending sequences, importance, or the like.

The foregoing describes some concepts in the embodiments of this application, and the following describes technical features in the embodiments of this application.

Figure 3:
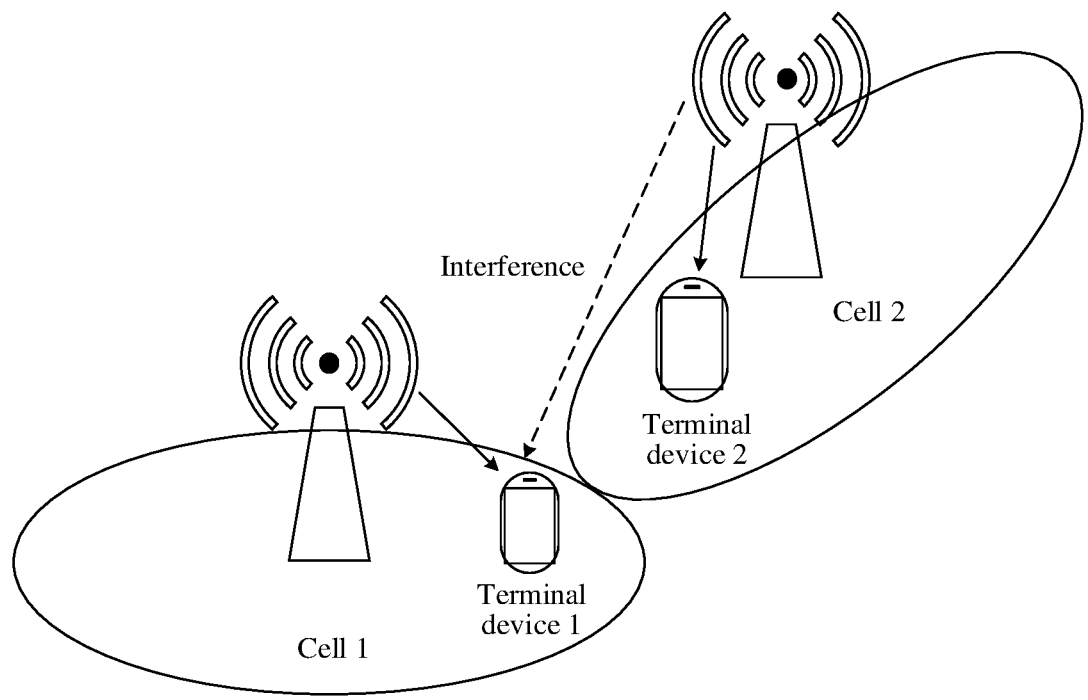
FIG. 3 is a schematic diagram in which there is no connection between transmission of two cells in an SC-PTM technology.

Currently, in the SC-PTM technology, there is no connection between transmission of two cells. For example, refer to FIG. 3. A cell 1 and a cell 2 are two neighboring cells, and SC-PTM transmission is being performed in each of the two cells. In the cell 1, there is a terminal device that receives a first service, and in the cell 2, there is also a terminal device that receives a first service. However, the terminal device in the cell 1 does not receive the first service sent in the cell 2, and the terminal device in the cell 2 does not receive the first service sent in the cell 1. For example, for the terminal device in the cell 1, the first service sent in the cell 2 is an interfering signal.

In this case, for example, the terminal device 1 is located at an edge of the cell 1 and in an area close to the cell 2. Because the terminal device 1 is located at the edge of the cell 1, reception quality of the terminal device 1 in the cell 1 is not good. However, the terminal device 1 is close to the cell 2, and interference caused by transmission of the first service in the cell 2 is large. This further causes deterioration of the reception quality of the terminal device 1.

It can be learned that the current SC-PTM technology may cause reception quality of a terminal device at an edge of a cell to be poor. If the MBSFN technology is used, a signal of the first service is enhanced. However, in the MBSFN technology, a separate multicast area needs to be designed, and transmission of a service needs to be performed by using a dedicated subframe. Consequently, transmission flexibility is reduced.

In view of this, the technical solutions in the embodiments of this application are provided. In the embodiments of this application, if a first multicast service needs to be sent in each of at least two cells, a first network device may determine a first parameter for the first multicast service, and send the first parameter to one or more network devices corresponding to the at least two cells, so that the network devices corresponding to the at least two cells may all schedule the first multicast service by using the first parameter. This is equivalent to breaking a cell boundary, so that combined transmission of the first multicast service is implemented in the at least two cells. If a terminal device located in one of the at least two cells is located at an edge of the cell, and the terminal device can receive a signal of another cell of the at least two cells, the terminal device can receive a first multicast service sent in the another cell. In this way, because a same parameter is used for a same multicast service, a terminal device at an edge of a cell is not limited to receiving only a multicast service of the current cell, and may also receive a same multicast service sent in another cell, so that a receiving success rate of the terminal device can be improved. In addition, the same multicast service sent in the another cell is no longer an interference signal for the terminal device, so that reception quality of the terminal device is improved.

In addition, this transmission manner in the embodiments of this application is flexible. Provided that transmission of a same service needs to be performed in a cell, a same resource may be allocated to the service for transmission, and there is no need to determine a fixed area or use a dedicated subframe for transmission, so that a service transmission process is flexible.

The technical solutions provided in the embodiments of this application may be applied to a 4th generation (4th generation, 4G) system, for example, an LTE system, or may be applied to a 5G system, for example, an NR system, or may be applied to a next generation mobile communication system or another similar communication system. This is not specifically limited.

The following describes several scenarios in which the embodiments of this application are applied. Refer to FIG. 4A to FIG. 4D.

Figure 4A:
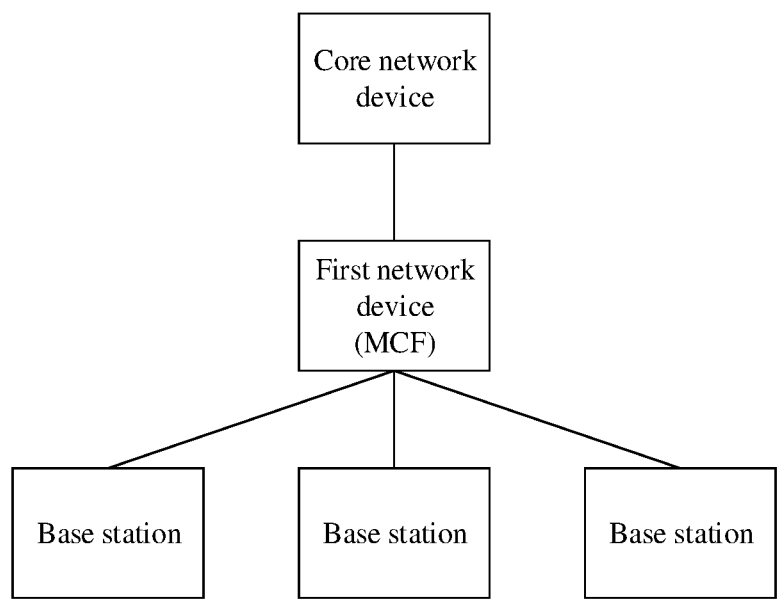
FIG. 4A to FIG. 4D are each a schematic diagram of an example of an application scenario according to an embodiment of this application.

FIG. 4A shows a first application scenario according to an embodiment of this application. In FIG. 4A, a first network device may be connected to a core network device, and the first network device is further connected to a plurality of second network devices.

The first network device is a network device having a multicast transmission control function. The first network device may be an independent network device, for example, an MCF or a multicast control entity (MCE). Alternatively, a function of the first network device may be integrated into a base station, a CU, or a DU. In this case, the first network device and one of the second network devices are a same network device. Alternatively, a function of the first network device may be integrated into the core network device, for example, integrated into an access and mobility management function (AMF).

The second network device is a device that sends a multicast service to the terminal device, for example, an access network device such as a base station, a CU, or a DU. The access network device corresponds to different devices in different systems. For example, in a 4G system, the access network device corresponds to an access network device in 4G, for example, an eNB, and in a 5G system, corresponds to an access network device in 5G, for example, a gNB. Certainly, the technical solutions provided in the embodiments of this application may also be applied to a future mobile communication system. Therefore, the second network device in FIG. 4A may also correspond to an access network device in the future mobile communication system.

In FIG. 4A, an example in which the first network device is an MCF and the second network device is a base station is used. Each base station may be further connected to one or more terminal devices, which are not shown in FIG. 4A. It can be seen that the MCF in FIG. 4A is not integrally deployed with the base stations. Therefore, in FIG. 4A, that the MCF is independently deployed is used as an example. This may be considered as an example of centralized deployment of the MCF.

Figure 4B:
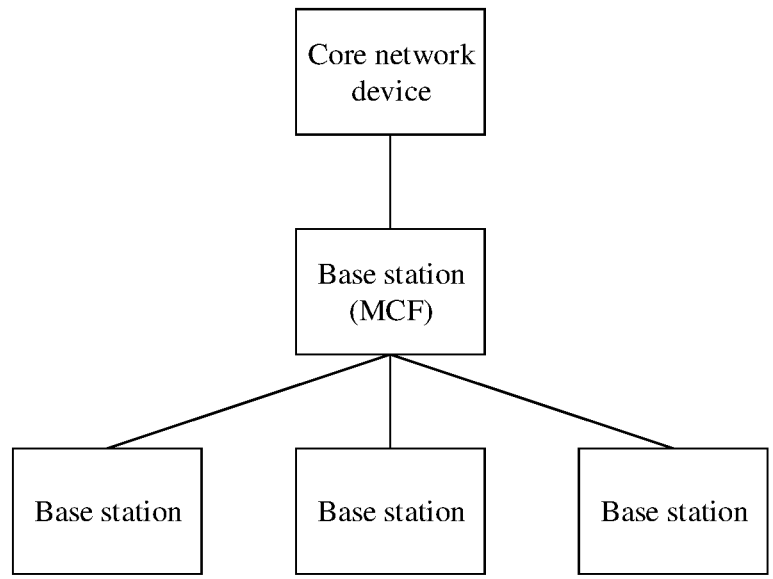

FIG. 4B shows a second application scenario according to an embodiment of this application. In FIG. 4B, a first network device may be connected to a core network device, and the first network device is further connected to a plurality of second network devices. For descriptions of the first network device and the second network device, refer to content of the descriptions of FIG. 4A. In FIG. 4B, an example in which the first network device is an MCF and the second network device is a base station is used. Each base station may be further connected to one or more terminal devices, which are not shown in FIG. 4B. It can be learned that the MCF in FIG. 4B is deployed on a side of one of the base stations, and only this base station is connected to the core network device. The other base stations are not directly connected to the core network device, but are connected to the core network device by using the base station on which the MCF is deployed. This may be considered as an example of centralized deployment of the MCF.

Figure 4C:
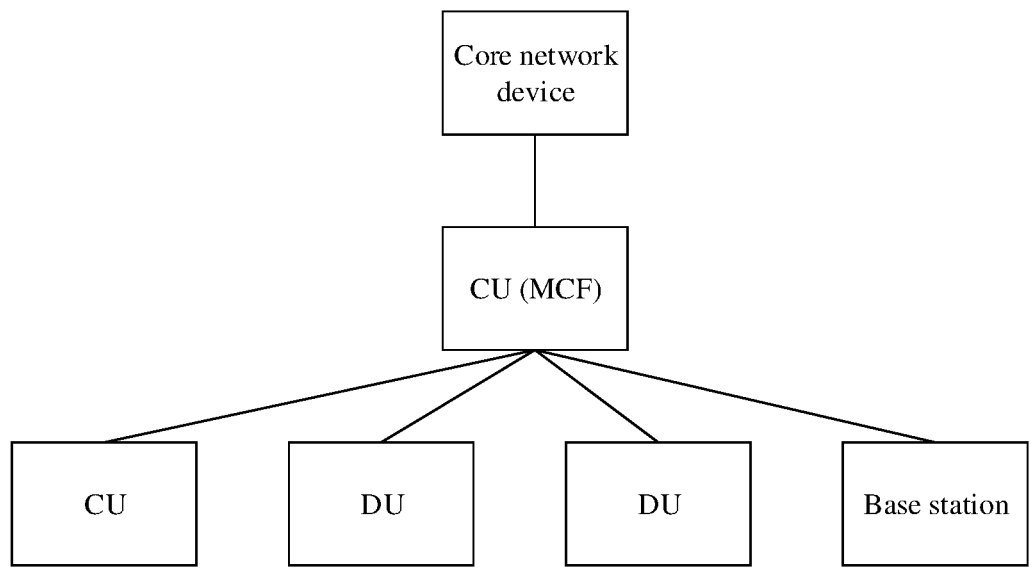

FIG. 4C shows a third application scenario according to an embodiment of this application. In FIG. 4C, a first network device may be connected to a core network device, and the first network device is further connected to a plurality of second network devices. For descriptions of the first network device and the second network device, refer to content of the descriptions of FIG. 4A. In FIG. 4C, an example in which the first network device is an MCF and the second network device is a base station is used. The base station may be further connected to one or more terminal devices, which are not shown in FIG. 4C. It can be learned that the MCF in FIG. 4C is deployed on a CU side, and a CU may be further connected to a CU, a DU, or a base station. This may be considered as an example of centralized deployment of the MCF.

Figure 4D:
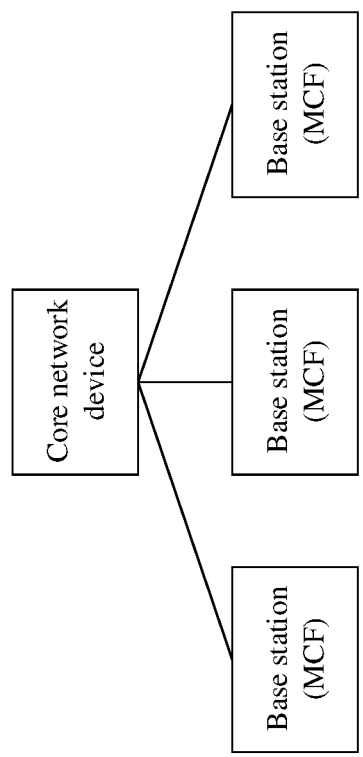

FIG. 4D shows a fourth application scenario according to an embodiment of this application. In FIG. 4D, a first network device may be connected to a core network device, and the first network device is further connected to a plurality of second network devices. For descriptions of the first network device and the second network device, refer to content of the descriptions of FIG. 4A. In FIG. 4D, an example in which the first network device is an MCF and the second network device is a base station is used. The base station may be further connected to one or more terminal devices, which are not shown in FIG. 4D. It can be learned that the MCF in FIG. 4D is deployed on a base station side, and an MCF is deployed on each base station. This may be considered as an example of distributed deployment of the MCF.

The following describes the technical solutions provided in the embodiments of this application with reference to the accompanying drawings. It should be noted that the multicast service in this specification is a service that can be simultaneously received by a plurality of terminal devices. Alternatively, the multicast service may also be referred to as a group cast service, a live service, a broadcast service, a single-transmit multiple-receive service, or the like, and a specific name is not limited.

Figure 5:
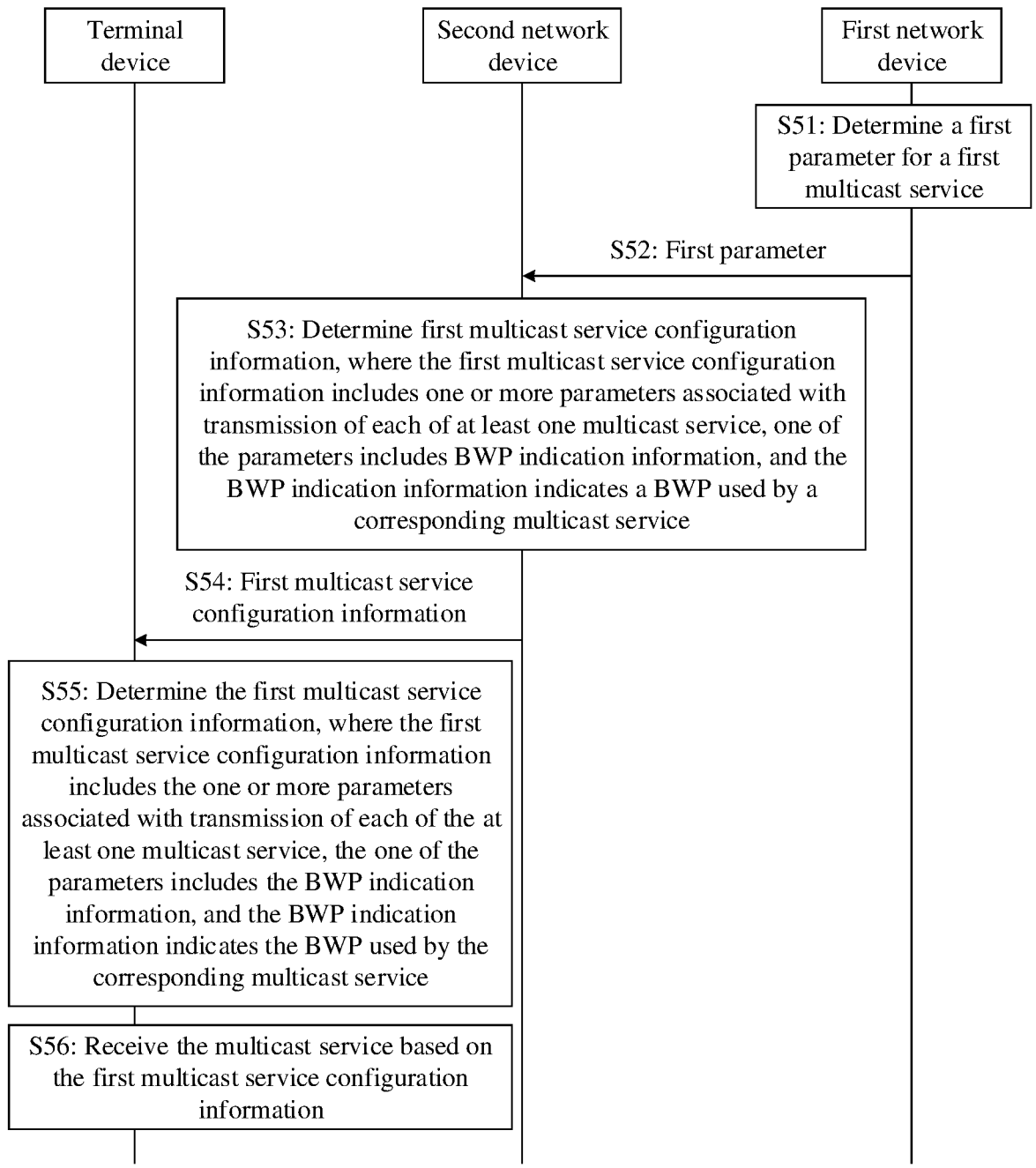
FIG. 5 is a flowchart of a communication method according to an embodiment of this application.

An embodiment of this application provides a communication method. FIG. 5 is a flowchart of the method. In the following description process, an example in which the method is applied to a network architecture shown in any one of FIG. 4A to FIG. 4D is used. In addition, the method may be performed by three communication apparatuses. The three communication apparatuses are, for example, a first communication apparatus, a second communication apparatus, and a third communication apparatus. The first communication apparatus may be a network device or a communication apparatus that can support a function required by the network device to implement the method. Alternatively, the first communication apparatus may be a terminal device or a communication apparatus that can support a function required by the terminal device to implement the method. Certainly, the first communication apparatus may alternatively be another communication apparatus, for example, a chip system. The second communication apparatus may be a network device or a communication apparatus that can support a function required by the network device to implement the method. Alternatively, the second communication apparatus may be a terminal device or a communication apparatus that can support a function required by the terminal device to implement the method. Certainly, the second communication apparatus may alternatively be another communication apparatus, for example, a chip system. Similarly, the third communication apparatus may be a network device or a communication apparatus that can support a function required by the network device to implement the method. Alternatively, the third communication apparatus may be a terminal device or a communication apparatus that can support a function required by the terminal device to implement the method. Certainly, the third communication apparatus may alternatively be another communication apparatus, for example, a chip system. In addition, implementations of the first communication apparatus, the second communication apparatus, and the third communication apparatus are not limited. For example, the first communication apparatus is a network device, the second communication apparatus is a network device, and the third communication apparatus is a terminal device; or the first communication apparatus, the second communication apparatus, and the third communication apparatus are all network devices; or the first communication apparatus, the second communication apparatus, and the third communication apparatus are all terminal devices; or the first communication apparatus is a network device, the second communication apparatus is a network device, and the third communication apparatus is a communication apparatus that can support a function required by a terminal device to implement the method.

For ease of description, the following uses an example in which the method is performed by a network device and a terminal device, that is, an example in which the first communication apparatus is a network device, the second communication apparatus is a network device, and the third communication apparatus is a terminal device. In this embodiment, the example in which the method is applied to the network architecture shown in any one of FIG. 4A to FIG. 4D is used. Therefore, a first network device described below may be the first network device in the network architecture shown in any one of FIG. 4A to FIG. 4D, and a second network device described below may be the second network device in the network architecture shown in any one of FIG. 4A to FIG. 4D.

S51: The first network device determines a first parameter for a first multicast service, where the first multicast service is associated with at least two cells, and the first parameter indicates a resource for transmission of the first multicast service.

The first multicast service may be any multicast service. This is not specifically limited. The first parameter is a parameter of a resource configured for the first multicast service.

In this embodiment of this application, the first parameter may include a plurality of parameters. In an implementation, the first parameter may include any combination of one or more of the following: configured grant information of the first multicast service, information about an RNTI corresponding to the first multicast service, information about a BWP, a DRX parameter corresponding to the first multicast service, configuration information of a demodulation reference signal corresponding to the first multicast service, rate matching reference signal information, information about a scrambling sequence used by a PDSCH that carries the first multicast service, or a service multiplexing identifier corresponding to the first multicast service. It should be noted that the service multiplexing identifier may indicate data of the first multicast service. The rate matching reference signal information indicates to exclude a location of the reference signal when the first multicast service is received. For example, the first parameter includes the configured grant information of the first multicast service, the information about the RNTI corresponding to the first multicast service, the information about the BWP, the DRX parameter corresponding to the first multicast service, the configuration information of the demodulation reference signal corresponding to the first multicast service, the rate matching reference signal information, the information about the scrambling sequence used by the PDSCH that carries the first multicast service, and the service multiplexing identifier corresponding to the first multicast service; or the first parameter includes the configured grant information of the first multicast service, the information about the RNTI corresponding to the first multicast service, the configuration information of the demodulation reference signal corresponding to the first multicast service, the information about the scrambling sequence used by the PDSCH that carries the first multicast service, and the service multiplexing identifier corresponding to the first multicast service; or the first parameter includes the configured grant information of the first multicast service, the information about the RNTI corresponding to the first multicast service, the information about the BWP, the DRX parameter corresponding to the first multicast service, the configuration information of the demodulation reference signal corresponding to the first multicast service, and the information about the scrambling sequence used by the PDSCH that carries the first multicast service.

This embodiment is not limited to the foregoing parameters. In addition to the foregoing parameters, the first parameter may alternatively be a set A including one or more other parameters as an element. The first network device may explicitly or implicitly notify the parameters shown in the foregoing embodiment based on the parameter set A. The following provides further examples or descriptions of the foregoing information. In addition, in addition to the foregoing information, the first parameter may further include other information, and content included in the first parameter is not limited.

The configured grant information of the first multicast service may include any combination of one or more of the following: time domain information for transmission of the first multicast service, frequency domain information for transmission of the first multicast service, the configuration information of the demodulation reference signal corresponding to the first multicast service, the rate matching reference signal information, information about an antenna port for transmission of the first multicast service, information about a modulation and coding scheme (MCS) corresponding to the first multicast service, or first indication information. The time domain information of the first multicast service and the frequency domain information of the first multicast service may be uniformly considered as resource indication information, or may be combined with a code domain resource or a space domain resource. The code domain resource and the space domain resource be separately included in the configured grant information of the first multicast service. The first indication information may indicate whether both the RNTI and the configured grant information need to be monitored. In an embodiment, the configured grant information of the first multicast service may include the time domain information for transmission of the first multicast service, the frequency domain information for transmission of the first multicast service, the configuration information of the demodulation reference signal corresponding to the first multicast service, the rate matching reference signal information, the information about the antenna port for transmission of the first multicast service, the information about the MCS corresponding to the first multicast service, and the first indication information; the configured grant information of the first multicast service includes the time domain information for transmission of the first multicast service, the frequency domain information for transmission of the first multicast service, the information about the antenna port for transmission of the first multicast service, the information about the MCS corresponding to the first multicast service, and the first indication information; the configured grant information of the first multicast service includes the time domain information for transmission of the first multicast service, the frequency domain information for transmission of the first multicast service, the information about the antenna port for transmission of the first multicast service, and the information about the MCS corresponding to the first multicast service; or the like. Alternatively, in addition to the foregoing information, the configured grant information of the first multicast service may further include other information. This is not specifically limited.

It should be noted that, the first indication information may indicate whether both the RNTI and the configured grant information need to be monitored. A specific indication manner may be performing explicit indication by using a bit field, or performing implicit indication by using another parameter. If the configured grant information of the first multicast service includes the first indication information, and the first indication information indicates that the RNTI and the configured grant information do not both need to be monitored. This indicates that the first indication information indicates that only the configured grant information needs to be monitored. In this case, after receiving the configured grant information of the first multicast service, the terminal device may directly receive, based on the configured grant information, the PDSCH that carries the first multicast service, and does not need to further monitor a G-RNTI corresponding to the first multicast service, in other words, does not need to further monitor a PDCCH scrambled by using the G-RNTI corresponding to the first multicast service (namely, a PDCCH that is based on the G-RNTI corresponding to the first multicast service). For example, the monitoring step may be skipped. If the terminal device does not monitor the G-RNTI corresponding to the first multicast service, but directly receives, based on the configured grant information, the PDSCH that carries the first multicast service, the terminal device may receive a DMRS based on the configuration information of the demodulation reference signal (DMRS) included in the configured grant information of the first multicast service, to demodulate, based on the received DMRS, the PDSCH that carries the first multicast service, and when receiving the PDSCH that carries the first multicast service, the terminal device may exclude a location of the reference signal based on the rate matching reference signal information included in the configured grant information, and receive only a PDSCH at another location. In this case, the second network device does not need to further perform scheduling by using the PDCCH that is based on the G-RNTI, so that overheads of the PDCCH are reduced.

On the other hand, if the configured grant information of the first multicast service includes the first indication information, and the first indication information indicates that both the RNTI and the configured grant information need to be monitored, it indicates that the first indication information indicates that the configured grant information needs to be monitored and the G-RNTI corresponding to the first multicast service also needs to be monitored (in other words, the PDCCH that is based on the G-RNTI corresponding to the first multicast service also needs to be monitored). In this case, after receiving the configured grant information of the first multicast service, the terminal device continues to detect the PDCCH that is based on the G-RNTI corresponding to the first multicast service. If the terminal device detects the PDCCH, the terminal device receives, based on scheduling of the PDCCH, the PDSCH that carries the first multicast service. If the terminal device does not detect the PDCCH, the terminal device receives, based on the configured grant information, the PDSCH that carries the first multicast service. If the terminal device does not detect the G-RNTI corresponding to the first multicast service and the terminal device receives, based on the configured grant information, the PDSCH that carries the first multicast service, the terminal device may receive the DMRS based on the configuration information of the demodulation reference signal included in the configured grant information of the first multicast service, so that the terminal device demodulates, based on the received DMRS, the PDSCH that carries the first multicast service, and when receiving the PDSCH that carries the first multicast service, the terminal device may exclude the location of the reference signal based on the rate matching reference signal information included in the configured grant information, and receive only the PDSCH at the another location. Alternatively, if the terminal device detects the G-RNTI corresponding to the first multicast service and receives, based on the scheduling of the PDCCH that is based on the G-RNTI, the PDSCH that carries the first multicast service, the terminal device may receive the DMRS based on the configuration information of the demodulation reference signal (which is not included in the configured grant information) included in the first parameter, so that the terminal device demodulates, based on the received DMRS, the PDSCH that carries the first multicast service, and when receiving the PDSCH that carries the first multicast service, the terminal device may exclude the location of the reference signal based on the rate matching reference signal information (which is not included in the configured grant information) included in the first parameter, and receive only the PDSCH at the another location. In this manner, in most cases, the second network device may not perform scheduling by using the PDCCH that is based on the G-RNTI, so that the overheads of the PDCCH are reduced. However, once the second network device needs to schedule more data or needs to change a scheduling configuration, the second network device may perform scheduling by using the PDCCH that is based on the G-RNTI, so that scheduling flexibility is improved. It can be learned that in this manner, not only flexible scheduling can be implemented, but also the overheads of the PDCCH can be reduced to some extent.

Certainly, alternatively, the configured grant information may not include the first indication information, and specifically, whether both the RNTI and the configured grant information need to be monitored or the RNTI and the configured grant information do not both need to be monitored may be specified in a protocol, or may be notified by the second network device to the terminal device in another manner.

The RNTI corresponding to the first multicast service is, for example, the G-RNTI. Usually, one multicast service may correspond to one G-RNTI. Therefore, information about the G-RNTI corresponding to the first multicast service may be notified to the second network device while being placed in the first parameter, so that the second network device uses a correct G-RNTI to send the first multicast service. The G-RNTI corresponding to the first multicast service may be used by the second network device to scramble a physical downlink control channel (PDCCH) on which the first multicast service is scheduled, or may be used by the second network device to scramble a cyclic redundancy code (CRC) of a physical downlink shared channel (PDSCH) that carries the first multicast service.

The information about the BWP included in the first parameter includes, for example, BWP indication information, and the BWP indication information may be information indicating the BWP used by the first multicast service. The BWP used by the first multicast service is a BWP used for transmission of the first multicast service. The BWP used for transmission of the first multicast service may be the initial BWP described above. In an example, the BWP indication information may indicate the initial BWP. For example, the BWP indication information may be implemented by using one or more bits (bit). One bit is used as an example. If a value of the bit is "1", it indicates that the BWP indication information indicates the initial BWP. Alternatively, in this case, the first parameter may not include the BWP indication information. It may be understood that, for information about a resource corresponding to a multicast service, if included BWP indication information indicates the initial BWP, or indicates that no BWP information is included, it indicates that transmission of the multicast service is performed by using the initial BWP. For details about configuration of the initial BWP, refer to the document 3GPP TS 38.311.

Alternatively, the BWP used for transmission of the first multicast service may not be the initial BWP, but be another BWP used for multicast transmission. In this case, the BWP indication information may be used to indicate the BWP. For example, the BWP indication information may be a BWP number, and the BWP number is associated with one piece of information in information about at least one BWP. This may be understood as that the BWP number is a number of information about the BWP included in second multicast BWP configuration information, and the number of the information about the BWP is used to indicate a location of the information about the BWP in the second multicast BWP configuration information. The second multicast BWP configuration information is described below. In conclusion, the second network device may determine information about a corresponding BWP in the second multicast BWP configuration information based on the BWP indication information, so that transmission of the first multicast service may be performed by using the BWP corresponding to the information about the BWP. It should be understood that the initial BWP may alternatively be numbered together with another BWP that is used for multicast transmission. This may be understood as that both information about the initial BWP and information about the another BWP used for multicast transmission may be included in the second multicast BWP configuration information. For example, 000 indicates the initial BWP, and 001 indicates a BWP used for multicast transmission.

Alternatively, the BWP indication information is information about a BWP used by the first multicast service. This is equivalent to that the BWP indication information may include a parameter of the corresponding BWP, for example, include at least one of frequency domain information, subcarrier spacing information, or cyclic prefix length information. Therefore, the terminal device can directly determine the corresponding BWP based on the BWP indication information, and does not need to use additional information such as the second multicast BWP configuration information. This is relatively direct. Regardless of whether the initial BWP or the another BWP is used for the first multicast service, the BWP indication information may be set in this manner.

Optionally, the information about the BWP included in the first parameter may further include at least one of configuration information of a demodulation reference signal corresponding to a BWP indicated by the BWP indication information, rate matching reference signal information corresponding to the BWP indicated by the BWP indication information, or information about a scrambling sequence used by a PDSCH corresponding to the BWP indicated by the BWP indication information. Although these parameters may be configured in the first resource configuration information as parameters corresponding to each service configuration, if some or all multicast services mapped to the BWP use same configuration information of a demodulation reference signal, same rate matching reference signal information, or same information about a scrambling sequence used by a PDSCH, the configuration information may be associated with a configuration of the BWP. During multicast service configuration, these parameters may not necessarily be configured for each multicast service repeatedly. Specifically, if a parameter of a multicast service does not carry at least one of configuration information of a demodulation reference signal, rate matching reference signal information, or information about a scrambling sequence used by a PDSCH, the terminal device may receive the multicast service by using a corresponding parameter included in information about a BWP included in the parameter of the multicast service. Specifically, functions of these parameters are the same as those described below.

The DRX parameter corresponding to the first multicast service may be used by the second network device to configure parameters of a DRX mechanism used when the first multicast service is sent. The terminal device may receive the first multicast service based on the DRX parameter corresponding to the first multicast service. For example, the DRX parameter corresponding to the first multicast service includes a DRX cycle corresponding to the first multicast service or timing duration of a DRX on duration timer (drx-ondurationtimer) corresponding to the first multicast service, and certainly, may further include another DRX-related parameter. Herein, the cycle and the duration may alternatively be indicated by different duration indication information. This is not specifically limited.

The configuration information of the demodulation reference signal corresponding to the first multicast service may indicate a DMRS, so that after learning of the configuration information of the demodulation reference signal corresponding to the first multicast service, the terminal device may demodulate, based on the DMRS, the PDSCH that carries the first multicast service. For example, the configuration information of the demodulation reference signal may include any combination of one or more of the following: type information of the DMRS, maximum length information of the DMRS, a scrambling code indication used by the DMRS, a time-domain location indication of the DMRS, or a frequency domain location indication of the DMRS.

The rate matching reference signal information may be used to indicate time domain locations or frequency domain locations of a group of OFDM symbols, or used to indicate time domain locations and frequency domain locations of a group of OFDM symbols. At locations of these OFDM symbols, the base station may be configured to send some reference information for another purpose, for example, send a synchronization signal block or a channel reference signal. These signals are unrelated to the current multicast service. Therefore, when receiving the PDSCH, the terminal device may exclude these locations based on the rate matching reference signal information.

The information about the scrambling sequence used by the PDSCH that carries the first multicast service is used to indicate the scrambling sequence used by the PDSCH that carries the first multicast service. After learning the information about the scrambling sequence used by the PDSCH that carries the first multicast service, the terminal device that is to receive the first multicast service may descramble, based on the scrambling sequence, the received PDSCH that carries the first multicast service. The scrambling sequence is used to scramble the entire PDSCH, and the G-RNTI is used to scramble the CRC of the PDSCH. For example, a mask operation is performed on the CRC by using the G-RNTI, and the masked CRC is sent to the terminal device.

The service multiplexing identifier corresponding to the first multicast service is used to indicate the data of the first multicast service. If two or more multicast services are scheduled by using a same G-RNTI, in data scheduled by using the same G-RNTI, an association relationship between data and a current service is identified by using a service multiplexing identifier. An association relationship between data and a service may be identified by using a logical channel. For example, a data block carried on the PDSCH received by the terminal device includes data on a logical channel 1 and data on a logical channel 2. If the terminal device determines that the service multiplexing identifier corresponding to the first multicast service indicates the logical channel 2, the terminal device may extract the data on the logical channel 2 as the data of the first multicast service.

The foregoing describes some information that may be included in the first parameter. The following further describes the second multicast BWP configuration information.

The first network device may determine the second multicast BWP configuration information. The second multicast BWP configuration information includes information about at least one BWP. Each piece of information in the information about the at least one BWP includes any combination of one or more of the following: the frequency domain information of the BWP, the subcarrier spacing information of the BWP, or the cyclic prefix length information of the BWP. Certainly, in addition to the foregoing information, information about a BWP may further include some other information about the BWP. This is not specifically limited. Optionally, at least one BWP corresponding to the information about the at least one BWP included in the second multicast BWP configuration information may be used for a multicast service.

Optionally, information about one BWP included in the second multicast BWP configuration information may further include at least one of configuration information of a demodulation reference signal corresponding to the BWP, a rate matching reference signal information corresponding to the BWP, or information about a scrambling sequence used by a PDSCH corresponding to the BWP. Although these parameters may be configured in the first resource configuration information as parameters corresponding to each service configuration, if some or all multicast services mapped to the BWP use same configuration information of a demodulation reference signal, same rate matching reference signal information, or same information about a scrambling sequence used by a PDSCH, the configuration information may be associated with the information about the BWP. During multicast service configuration, these parameters may not necessarily be configured for each multicast service repeatedly. Specifically, if a parameter of a multicast service does not carry at least one of configuration information of a demodulation reference signal, rate matching reference signal information, or information about a scrambling sequence used by a PDSCH, the terminal device may receive the multicast service by using a corresponding parameter included in information that is about a BWP corresponding to the multicast service and that is in the second multicast BWP configuration information. Specifically, functions of these parameters are the same as those described below.

For example, the first network device needs to configure resources for a plurality of scheduled multicast services, and each multicast service needs to have a corresponding BWP. If all the multicast services configured by the first network device use the initial BWP, and the information about the initial BWP may be notified by using a broadcast message or the like, the first network device may not need to determine the second multicast BWP configuration information, but only needs to indicate the initial BWP by using first indication information in information about a resource of each multicast service.

Alternatively, if the first network device configures an initial BWP for none of the scheduled multicast services, the first network device may determine the second multicast BWP configuration information, where the second multicast BWP configuration information may include information about BWPs configured by the first network device for all the scheduled multicast services. In addition, the second multicast BWP configuration information may further include the BWP number. In the second multicast BWP configuration information, the BWP number is in a one-to-one correspondence with information about a BWP, and one BWP number is used to indicate information about one BWP. For example, the first network device schedules a multicast service 1, a multicast service 2, and a multicast service 3, both the multicast service 1 and the multicast service 2 use a BWP 1, the multicast service 3 uses a BWP 2, and neither the BWP 1 nor the BWP 2 is an initial BWP. In this case, the second multicast BWP configuration information determined by the first network device may include a number of the BWP 1, information about the corresponding BWP 1, and include a number of the BWP 2 and information about the corresponding BWP 2.

Alternatively, if BWPs configured by the first network device for all the scheduled multicast services include both the initial BWP and another BWP, the first network device may determine the second multicast BWP configuration information, where the second multicast BWP configuration information may include information about the another BWP that is other than the initial BWP and that is configured by the first network device for the scheduled multicast services. In addition, the second multicast BWP configuration information may further include the BWP number. In the second multicast BWP configuration information, the BWP number is in a one-to-one correspondence with information about a BWP, and one BWP number is used to indicate information about one BWP. For example, the first network device schedules a multicast service 1, a multicast service 2, a multicast service 3, and a multicast service 4, both the multicast service 1 and the multicast service 2 use a BWP 1, the multicast service 3 uses a BWP 2, the multicast service 4 uses a BWP 3, and none of the BWP 1, the BWP 2, and a BWP 3 is the initial BWP. In this case, the second multicast BWP configuration information determined by the first network device may include a number of the BWP 1, information about the corresponding BWP 1, a number of the BWP 2, information about the corresponding BWP 2, a number of the BWP 3, and information about the corresponding BWP 3, but does not include information about the BWP 4 (and certainly does not include a number of the BWP 4 either).

The first network device may schedule a multicast service for which combined transmission can be performed. For a multicast service for which combined transmission cannot be performed, for example, a multicast service that is sent only in one cell, or for a multicast service for which the first network device considers that combined transmission does not need to be performed, for example, a multicast service that is sent in a non-neighboring cell, the first network device may schedule or may not schedule the multicast service. If the first network device also needs to schedule multicast services for which combined transmission cannot be or does not need to be performed, the first network device also determines parameters of these multicast services, determines information about BWPs corresponding to these multicast services, adds the parameters of these multicast services to the second multicast service configuration information, and adds the information about the BWPs corresponding to these multicast services to the second multicast BWP configuration information. The second multicast service configuration information may include a parameter of a service scheduled by the first network device. For example, the second multicast service configuration information includes the first parameter. Alternatively, if the first network device does not schedule these multicast services for which combined transmission cannot be or does not need to be performed, the first network device does not configure resources for these multicast services, does not add the parameters of these multicast services to the second multicast service configuration information, and does not add the information about the BWPs corresponding to these multicast services to the second multicast BWP configuration information. In addition, if the first network device does not schedule these multicast services for which combined transmission cannot be or does not need to be performed, the first network device may send third indication information to the second network device. The third indication information may be used to indicate information about a multicast service that needs to be independently scheduled by the second network device. For example, the third indication information indicates the second network device to independently schedule transmission of the second multicast service. After receiving the third indication information, the second network device may configure a resource for the second multicast service, to perform transmission of the second multicast service.

S52: The first network device sends the first parameter to a network device, where the network device is associated with the at least two cells.

For example, the first network device may send the first parameter to the network device through multicast configuration signaling. The multicast configuration signaling may include a multicast service addition message, a multicast service modification message, a multicast service establishment message, or the like.

The at least two cells are associated with a multicast service. Specifically, at least two cell identities (IDs) of the at least two cells may be associated with the first multicast service, or at least two cell identities of the at least two cells may be associated with parameters of the first multicast service. The parameters of the first multicast service may be a group of parameters used to represent the first multicast service. Alternatively, other feature parameters of the two cells may be associated with the first multicast service.

In another embodiment, that a cell is associated with a multicast service may be understood as that the multicast service is sent in the cell. In this case, the first network device may determine cells in which the first multicast service needs to be sent, that is, determine cells that are associated with the first multicast service. There may be different criteria for the first network device to determine the cells in which the first multicast service needs to be sent. For example, the determining may be performed based on information such as a cell service type, cell parameter information, a cell location relationship (for example, a neighbor relationship between cells), or other identification or group information, or may be performed based on information such as a notification of a core network or a location of a terminal.

For example, the core network device may send multicast service start information to the first network device, and the multicast service start information may carry a correspondence between a cell and a multicast service. After receiving the multicast service start information, the first network device may determine multicast services that need to be sent in a corresponding cell, so as to determine cells in which the first multicast service needs to be sent.

Alternatively, the first network device may determine the at least two cells based on information about a cell in which a terminal device that is to receive the first multicast service is located.

For example, the multicast service start information may also carry information about a multicast service that a terminal device is interested in receiving. After receiving the information, the first network device may determine information about multicast services that a terminal device is interested in receiving in a corresponding cell, that is, may determine multicast services that need to be sent in the corresponding cell, so as to determine cells in which the first multicast service needs to be sent.

For another example, a terminal device served by the second network device may send notification information to the second network device, where the notification information is used to indicate information about a multicast service that the terminal device is interested in receiving, and the second network device may send, to the first network device, the information about the multicast service that the terminal device is interested in receiving. After receiving the information, the first network device may determine information about multicast services that a terminal device in a corresponding cell is interested in receiving, that is, may determine multicast services that need to be sent in the corresponding cell, so as to determine cells in which the first multicast service needs to be sent.

For example, the at least two cells are all the cells that are determined by the first network device and in which the first multicast service needs to be sent, or the at least two cells are neighboring cells in the cells that are determined by the first network device and in which the first multicast service needs to be sent.

In other words, after determining the cells in which the first multicast service needs to be sent, the first network device may send the first parameter to a network device corresponding to these cells. Therefore, after receiving the first parameter, the network device corresponding to these cells may schedule a resource indicated by the first parameter, to perform transmission of the first multicast service, so that combined transmission of the first multicast service is implemented in these cells, and requirements of these cells are satisfied. Alternatively, it is considered that if cells are non-neighboring cells, even if combined transmission of a multicast service is performed, in one of the cells, quality of receiving the multicast service sent in another cell in the cells may not be very good, or the multicast service may not be received. Therefore, for non-neighboring cells, combined transmission has little significance. Therefore, after determining the cells in which the first multicast service needs to be sent, the first network device may select neighboring cells from the cells, and send the first parameter to a network device corresponding to the neighboring cells. After receiving the first parameter, the network device corresponding to the neighboring cells may schedule a resource indicated by the first parameter, to perform transmission of the first multicast service, so that combined transmission of the first multicast service is implemented in the neighboring cells, to improve efficiency of the combined transmission.

Figure 6:
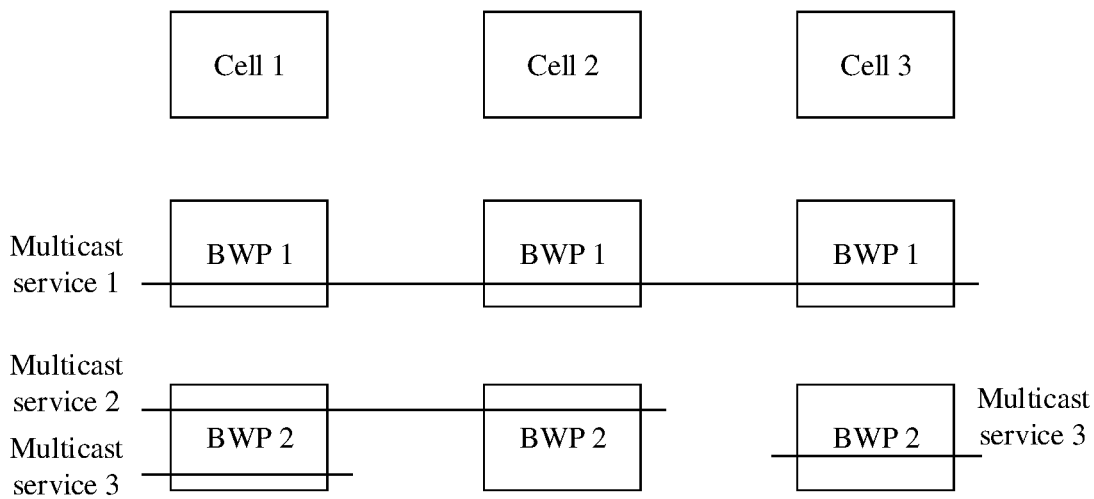
FIG. 6 is a schematic diagram of scheduling a multicast service by a first network device according to an embodiment of this application.

For example, if the first network device determines that a terminal device in each of the cell 1, the cell 2, and the cell 3 is to receive the multicast service 1, the first network device may send the first parameter to a network device corresponding to the cell 1, the cell 2, and the cell 3, to perform transmission of the multicast service 1. Similarly, if the first network device determines that a terminal device in each of the cell 1 and the cell 2 is to receive the multicast service 2, the first network device may send the first parameter to the cell 1 and the cell 2, to perform transmission of the multicast service 2. In addition, the first network device determines that a terminal device in each of the cell 1 and the cell 3 is to receive the multicast service 3, and the cell 1 and the cell 3 are not neighboring to each other. In this case, the first network device may send the first parameter to the cell 1 and the cell 3, to perform transmission of the multicast service 3. Alternatively, the first network device may not set a parameter for the first multicast service, in other words, the first network device may not schedule transmission of the multicast service 3, but may notify the second network device to schedule the transmission of the multicast service 3. Alternatively, the first network device may continue to set a parameter for the first multicast service. For example, the first network device separately configures a parameter 1 and a parameter 2 for the first multicast service, sends the parameter 1 to the cell 1, and sends the parameter 2 to the cell 3, so that transmission of the multicast service 3 is separately performed in the cell 1 and the cell 3. For this, refer to FIG. 6. In FIG. 6, transmission of the multicast service 1, the multicast service 2, and the multicast service 3 may be performed in the cell 1, transmission of the multicast service 1 and the multicast service 2 may be performed in the cell 2, and transmission of the multicast service 1 and the multicast service 3 may be performed in the cell 3. Parameters of the multicast service 1 include, for example, a BWP 1 and a G-RNTI 1, parameters of the multicast service 2 include, for example, a BWP 2 and a G-RNTI 2, and parameters of the multicast service 3 include, for example, a BWP 2 and a G-RNTI 4.

That a cell is associated with a network device means that the network device is a network device that provides a service of the cell. The at least two cells may correspond to one network device. For example, the network device is a base station, and the at least two cells may be cells provided by one base station. Alternatively, the at least two cells may correspond to a plurality of network devices, and a quantity of network devices corresponding to the at least two cells may be less than or equal to a quantity of the at least two cells. For example, the network devices are base stations, and the at least two cells may be cells provided by the plurality of base stations. In addition, if the at least two cells correspond to one network device, the at least two cells may include only secondary cells, or include both a primary cell and a secondary cell. Alternatively, if the at least two cells correspond to a plurality of network devices, the at least two cells may include only primary cells of the plurality of network devices, or include only secondary cells of the plurality of network devices; or for some network devices in the plurality of network devices, the at least two cells include only primary cells of the some network devices, and for the remaining network devices other than the some network devices in the plurality of network devices, the at least two cells include only secondary cells of the remaining network devices; or for one network device in the plurality of network devices, the at least two cells include both a primary cell of the network device and a secondary cell of the network device.

For example, the second network device is one network device in one or more network devices corresponding to the at least two cells. If a quantity of network devices corresponding to at least two cells is greater than 1, each network device has a similar operation manner after receiving the first parameter. Therefore, the second network device is used for description herein.

Because the first network device may determine multicast services that need to be sent in a corresponding cell, there may be a plurality of multicast services scheduled by the first network device, and the first multicast service is only one of the plurality of multicast services. Because the first network device may schedule a plurality of multicast services, the first network device may configure corresponding resources for the plurality of scheduled multicast services. In this case, the first network device may send a parameter of each scheduled multicast service to a network device of a corresponding cell. For example, the second network device is one network device in one or more network devices corresponding to the at least two cells. The first network device may send the second multicast service configuration information to the second network device. The second multicast service configuration information includes a parameter configured by the first network device for a scheduled multicast service, and all multicast services included in the second multicast service configuration information are multicast services that need to be sent by the second network device. For example, the second multicast service configuration information includes the first parameter in the foregoing embodiment. For example, the second network device is a base station. Because a cell corresponding to the base station is different from a cell corresponding to another base station, parameters included in multicast service configuration information sent by the first network device to the base station may be completely or partially different from parameters included in multicast service configuration information sent by the first network device to the another base station. This is not specifically limited. In FIG. 5, an example in which the first network device sends the first parameter to the second network device is used. For example, the second multicast service configuration information is represented by a list, or certainly may be represented in another form, for example, by an indication field. Alternatively, the first network device may send, to the second network device at a time, a parameter configured for only one scheduled multicast service. This is not specifically limited.

If the first network device also determines the second multicast BWP configuration information, the first network device may also send the second multicast BWP configuration information to the second network device. Correspondingly, the second network device may receive the second multicast BWP configuration information from the first network device. Both the second multicast BWP configuration information and the second multicast service configuration information are used by the second network device to schedule a resource in a corresponding cell to perform transmission of a corresponding service. For example, the first network device may place the second multicast service configuration information and the second multicast BWP configuration information in one message and send the message to the second network device, or the first network device may place the second multicast service configuration information and the second multicast BWP configuration information in different messages and send the messages to the second network device. If the first network device sends the second multicast service configuration information and the second multicast BWP configuration information to the second network device in different messages, the first network device may first send the second multicast service configuration information and then send the second multicast BWP configuration information, or may first send the second multicast BWP configuration information and then send the second multicast service configuration information, or may simultaneously send the second multicast service configuration information and the second multicast BWP configuration information.

For example, the second multicast service configuration information and the second multicast BWP configuration information may be collectively referred to as second multicast configuration information. In this case, the first network device may send both the second multicast configuration information by using a multicast service establishment message, and then the second network device receives the second multicast configuration information by using the multicast service establishment message.

Figure 7:
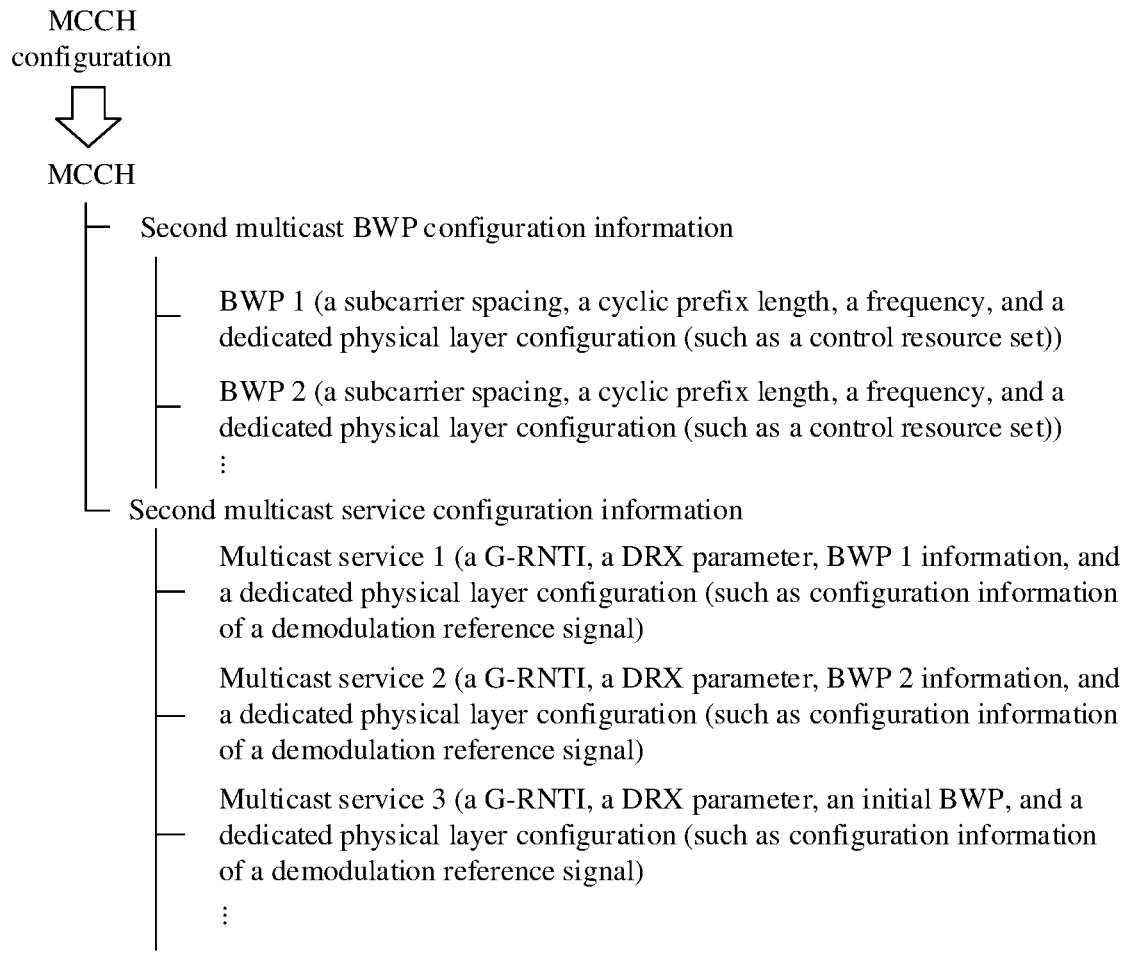
FIG. 7 is a schematic diagram in which a first network device sends second multicast BWP configuration information and second multicast service configuration information to a second network device according to an embodiment of this application.

For example, the first network device may send the second multicast BWP configuration information and the second multicast service configuration information on an MCCH. Refer to FIG. 7. An example in which both the second multicast BWP configuration information and the second multicast service configuration information are represented by a list is used in FIG. 7.

In addition, it can be learned from the foregoing descriptions that the first network device schedules a multicast service, and it is very likely that another network device (for example, the second network device) also schedules a multicast service. For example, the first network device schedules a multicast service for which combined transmission can be performed, and the another network device schedules a multicast service for which combined transmission cannot be or does not need to be performed. Each network device needs to use a G-RNTI when scheduling a multicast service. Therefore, if different network devices use a same G-RNTI when scheduling different multicast services, a conflict occurs. To avoid this case as much as possible, the first network device may determine at least one RNTI that needs to be reserved for the multicast service, and send the information about the at least one RNTI to one or more other network devices, to indicate the other network devices to reserve the at least one RNTI, that is, to indicate the other network devices not to use the at least one RNTI. In a process of the foregoing determining, the determining may be performed voluntarily based on signaling sent by a core network or a network device, or may be performed based on information about the other network devices. The other network devices include, for example, all network devices scheduled by the first network device, and the RNTI herein is, for example, a G-RNTI. For example, the second network device is a network device in the other network devices. After receiving the information about the at least one RNTI, the second network device may determine not to use the at least one RNTI when configuring an RNTI for the multicast service. For example, a quantity of RNTIs reserved by the first network device may be related to a quantity of services scheduled by the first network device. For example, the quantity of reserved RNTIs is greater than or equal to the quantity of services scheduled by the first network device. Certainly, a factor of determining the quantity of reserved RNTIs is not limited thereto.

Specifically, for example, the first network device sends, to the second network device, a list of RNTIs that need to be reserved, and one element in the list represents one RNTI. Alternatively, the first network device sends, to the second network device, information about a start RNTI and an end RNTI in RNTIs that need to be reserved, to indicate that all the RNTIs in the range need to be reserved. For example, if the start RNTI is 10001 and the end RNTI is 11001, 1001 RNTIs in the range are all reserved by the first network device. Alternatively, the list may be an array.

Optionally, after receiving the information about the at least one RNTI from the first network device, if the second network device finds that some RNTIs have other purposes (for example, have been allocated to a terminal device for use, or have been allocated as paging RNTIs, system information RNTIs, or random access responses RNTIs) and cannot be reserved for the multicast service, the second network device may send reservation response information to the first network device. The reservation response information may carry information about each RNTI that cannot be reserved, or carry information about a range of RNTIs that cannot be reserved (for example, carry information about a start RNTI and an end RNTI that cannot be reserved). The first network device may receive reservation response messages from a plurality of second network devices. In this case, the first network device may determine, based on feedback statuses of all the second network devices, information about RNTIs that can be reserved, and then resend, to the second network devices, information about RNTIs that need to be reserved.

For example, the first network device sends the information about the at least one RNTI to a plurality of second network devices, and the at least one RNTI includes, for example, all RNTIs from 10000 to 10500. After the plurality of second network devices receive the information about the at least one RNTI, one of the second network devices sends a reservation response message to the first network device, where the reservation response message indicates that two RNTIs 10001 and 10003 cannot be reserved; another second network device in the second network devices sends a reservation response message to the first network device, where the reservation response message indicates that an RNTI 10049 cannot be reserved; and the other second network devices do not feed back an RNTI that cannot be reserved. In this case, the first network device determines to deduct the three RNTIs 10001, 10003, and 10049 from 10000 to 10500, and the other RNTIs may be reserved. In this case, the network device resends, to the plurality of second network devices, information about RNTIs that need to be reserved. The RNTIs that need to be reserved include the remaining RNTIs other than the three RNTIs 10001, 10003, and 10049 in all the RNTIs from 10000 to 10500. For example, the information, resent by the network device, about the RNTIs that need to be reserved may include a start RNTI (10000), an end RNTI (10500), and the excluded RNTIs (10001, 10003, and 10049).

The content related to that the first network device sends the at least one RNTI to the second network device may be used as a part of content in the embodiment shown in FIG. 5, or may exist as an independent embodiment. In addition, each step in the embodiment may be properly deleted, combined, or the like, or may be an independent embodiment.

In addition, for a service that requires combined transmission, the first network device may further notify a corresponding network device of information about a cell in which combined transmission is performed. For example, the information about the cell is a cell ID. For example, for the second network device, the first network device may send, to the second network device, information about a cell related to a service requiring combined transmission, so that the second network device sends the service requiring combined transmission. For example, the first multicast service is a service that needs to be sent by the second network device and that requires combined transmission. Related cells are the at least two cells. The at least two cells may all correspond to the second network device; or some cells in the at least two cells correspond to the second network device, and another cell in the at least two cells corresponds to another network device. In this case, the first network device may send cell IDs of the at least two cells to the second network device, so that the second network device can determine cells in which combined transmission of the first multicast service is performed. Alternatively, the first network device may send, to the second network device, only cell IDs of cells that are in the at least two cells and that correspond to the second network device, and the second network device only needs to know cells that are in the cells corresponding to the second network device and in which combined transmission of the first multicast service needs to be performed. This helps save a transmission resource for cell ID sending.

S53: The second network device determines first multicast service configuration information, where the first multicast service configuration information includes one or more parameters associated with transmission of each of at least one multicast service, one of the parameters includes BWP indication information, and the BWP indication information indicates a BWP used by a corresponding multicast service.

A parameter associated with transmission of a multicast service may be a parameter of a resource used for transmission of the multicast service.

The at least one multicast service may be all or some multicast services that need to be sent by the second network device. For example, that the second network device receives the second multicast service configuration information from the first network device means that the first multicast service configuration information is determined. In this case, the second multicast service configuration information is the first multicast service configuration information. In addition, in this case, S52 and S53 may be considered as a same step. Alternatively, the second network device may learn of the first multicast service configuration information as specified in a protocol, and does not need to obtain the second multicast service configuration information from the first network device. Alternatively, the second network device receives the second multicast service configuration information from the first network device, and the second multicast service configuration information from the first network device includes only some multicast services that need to be sent by the second network device. In this case, the second network device may configure resources for the remaining multicast services that need to be sent by the second network device, and add configured parameters to the second multicast service configuration information. Updated second multicast service configuration information is the first multicast service configuration information determined by the second network device. When the second network device configures a resource for a multicast service, all configured parameters may be determined by the second network device voluntarily, or the first network device may configure some parameters for the multicast service. For example, a G-RNTI may be configured by the first network device, and a remaining parameter may be configured by the second network device.

In addition, the second network device may further determine the first multicast BWP configuration information. For content included in the first multicast BWP configuration information, refer to the foregoing descriptions. For example, that the second network device receives the second multicast BWP configuration information from the first network device means that the first multicast BWP configuration information is determined. In this case, the second multicast BWP configuration information is the first multicast BWP configuration information. Alternatively, the second network device may learn of the first multicast BWP configuration information as specified in a protocol, and does not need to obtain the second multicast BWP configuration information from the first network device. Alternatively, the second network device receives the second multicast BWP configuration information from the first network device, and the second multicast BWP configuration information from the first network device includes only some multicast services that need to be sent by the second network device. In this case, the second network device may configure BWPs for the remaining multicast services that need to be sent by the second network device, and add information about the configured BWPs to the second multicast BWP configuration information. Updated second multicast BWP configuration information is the first multicast BWP configuration information determined by the second network device. Certainly, if all multicast services that need to be sent by the second network device use the initial BWP, the second network device does not need to determine the first multicast BWP configuration information.

For example, if the first network device does not schedule a multicast service for which combined transmission cannot be or does not need to be performed, the first network device may send third indication information to the second network device. The third indication information may be used to indicate information about a multicast service that needs to be independently scheduled by the second network device. For example, the third indication information indicates that the second network device independently schedules transmission of the second multicast service. In this case, after receiving the third indication information, the second network device may configure a resource for the second multicast service, and add a parameter configured for the second multicast service to the second multicast service configuration information received from the first network device, to obtain updated multicast service configuration information, that is, obtain the first multicast service configuration information. After receiving the third indication information, the second network device needs to configure a BWP for the second multicast service. If the BWP used by the second multicast service is not an initial BWP, and information about the BWP used by the second multicast service is not included in the second multicast BWP configuration information received from the first network device, the second network device may add the information about the BWP configured for the second multicast service to the second multicast BWP configuration information, to obtain updated multicast BWP configuration information, that is, obtain the first multicast BWP configuration information. If the second network device receives the information about the at least one RNTI from the first network device, when configuring the resource for the multicast service, the second network device does not use the at least one RNTI indicated by the first network device.

The first multicast service configuration information may include a parameter used for transmission of each of the at least one multicast service, and the parameter of each multicast service includes information about a BWP used by the corresponding multicast service. The foregoing describes the first parameter of the first multicast service. For a parameter of each multicast service included in the multicast service configuration information, refer to the first parameter.

The second multicast service configuration information and/or the second multicast BWP configuration information may be sent to a terminal in a system broadcast message, or may be sent to the terminal device on an MCCH. Configuration information of the MCCH may be sent in system broadcast information.

S54: The second network device sends the first multicast service configuration information to the terminal device, and the terminal device receives the first multicast service configuration information from the second network device.

The second network device sends, to the terminal device, the first multicast service configuration information determined by the second network device. For example, the first multicast service configuration information is the second multicast service configuration information sent by the first network device to the second network device, or the first multicast service configuration information is determined by the second network device based on a protocol, or the first multicast service configuration information is obtained after the second network device updates the second multicast service configuration information received from the first network device.

In addition, if the second network device determines the first multicast BWP configuration information, the second network device may also send the first multicast BWP configuration information to the terminal device, and the terminal device receives the first multicast BWP configuration information from the second network device. Similarly, the second network device sends, to the terminal device, the first multicast BWP configuration information determined by the second network device. For example, the first multicast BWP configuration information is the second multicast BWP configuration information sent by the first network device to the second network device, or the first multicast BWP configuration information is determined by the second network device based on a protocol, or the first multicast BWP configuration information is obtained after the second network device updates the second multicast BWP configuration information received from the first network device.

S55: The terminal device determines the first multicast service configuration information, where the first multicast service configuration information includes the one or more parameters associated with transmission of each of the at least one multicast service, the one of the parameters includes the BWP indication information, and the BWP indication information indicates the BWP used by the corresponding multicast service.

The at least one multicast service may be all or some multicast services that need to be sent by the terminal device. For example, that the terminal device receives the first multicast service configuration information from the second network device means that the first multicast service configuration information is determined. Alternatively, the terminal device may learn of the first multicast service configuration information as specified in a protocol, and does not need to obtain the first multicast service configuration information from the second network device.

The first multicast service configuration information may be received on a multicast control channel, or may be received through dedicated signaling. For example, the dedicated signaling is an RRC reconfiguration message.

In addition, the terminal device may further determine the first multicast BWP configuration information. For content included in the first multicast BWP configuration information, refer to the foregoing descriptions. For example, that the terminal device receives the first multicast BWP configuration information from the second network device means that the first multicast BWP configuration information is determined. In this case, S54 and S55 may be considered as a same step. Certainly, if all multicast services that need to be sent by the second network device use the initial BWP, the second network device does not need to determine the first multicast BWP configuration information, and does not send the first multicast BWP configuration information to the terminal device. In this case, the terminal device does not receive the first multicast BWP configuration information from the second network device. Alternatively, the terminal device may learn of the first multicast BWP configuration information as specified in a protocol, and does not need to obtain the first multicast BWP configuration information from the second network device.

The first multicast service configuration information may include a parameter used for transmission of each of the at least one multicast service, and the parameter of each multicast service includes information about a BWP used by the corresponding multicast service. The foregoing describes the first parameter of the first multicast service. For information about a resource of each multicast service included in the multicast service configuration information, refer to the first parameter.

S56: The terminal device receives a multicast service based on the first multicast service configuration information.

If the terminal device determines only the first multicast service configuration information, the terminal device receives the multicast service based on the first multicast service configuration information. Alternatively, if the terminal device determines the first multicast service configuration information and the first multicast BWP configuration information, the terminal device receives the multicast service based on the first multicast service configuration information and the first multicast BWP configuration information. In this case, the terminal device monitors the G-RNTI related to the first multicast service only in the first multicast BWP, and does not monitor the G-RNTI in another BWP.

For example, the terminal device needs to receive the first multicast service, the configured grant information of the first multicast service includes second indication information, and the terminal device determines that the second indication information indicates that the RNTI and the configured grant information do not both need to be monitored. This indicates that the second indication information indicates that only the configured grant information needs to be monitored. In this case, after receiving the configured grant information of the first multicast service, the terminal device may directly receive, based on the configured grant information, the PDSCH that carries the first multicast service, and does not need to monitor the G-RNTI corresponding to the first multicast service. The terminal device may receive the DMRS based on the configuration information of the demodulation reference signal included in the configured grant information of the first multicast service, so as to demodulate, based on the received DMRS, the PDSCH that carries the first multicast service. When receiving the PDSCH that carries the first multicast service, the terminal device may exclude the location of the reference signal based on the rate matching reference signal information included in the configured grant information, and receive only the PDSCH at the another location.

Alternatively, if the configured grant information of the first multicast service includes second indication information, and the second indication information indicates that both the RNTI and the configured grant information need to be monitored, it indicates that the second indication information indicates that both the configured grant information and the G-RNTI that is corresponding to the first multicast service need to be monitored. In this case, after receiving the configured grant information of the first multicast service, the terminal device monitors, on a corresponding multicast service receiving occasion, for example, at a time point calculated based on the DRX parameter, a PDCCH that is based on the G-RNTI corresponding to the first multicast service. If the terminal device detects the PDCCH, the terminal device receives, based on scheduling of the PDCCH, the PDSCH that carries the first multicast service. If the terminal device does not detect the PDCCH, the terminal device receives, based on the configured grant information, the PDSCH that carries the first multicast service. Certainly, the terminal device may monitor both the G-RNTI and the PDSCH that is corresponding to the configured grant information, and service receiving is performed based on the G-RNTI or the PDSCH whose monitoring succeeds. This is not limited in this embodiment of this application. If the terminal device does not detect the G-RNTI corresponding to the first multicast service, the terminal device may receive the DMRS based on the configuration information of the demodulation reference signal included in the configured grant information of the first multicast service, so that the terminal device demodulates, based on the received DMRS, the PDSCH that carries the first multicast service, and when receiving the PDSCH that carries the first multicast service, the terminal device may exclude the location of the reference signal based on the rate matching reference signal information included in the configured grant information, and receive only the PDSCH at the another location. Alternatively, if the terminal device detects the G-RNTI corresponding to the first multicast service, the terminal device may receive the DMRS based on the configuration information of the demodulation reference signal (which is not included in the configured grant information) included in the first parameter, so that the terminal device demodulates, based on the received DMRS, the PDSCH that carries the first multicast service, and when receiving the PDSCH that carries the first multicast service, the terminal device may exclude the location of the reference signal based on the rate matching reference signal information (which is not included in the configured grant information) included in the first parameter, and receive only the PDSCH at the another location.

Certainly, alternatively, the configured grant information may not include the second indication information, and specifically, whether both the RNTI and the configured grant information need to be monitored or the RNTI and the configured grant information do not both need to be monitored may be specified in a protocol, or may be notified by the second network device to the terminal device in another manner. In this case, the terminal device receives the first multicast service based on whether both the RNTI and the configured grant information need to be monitored. For a specific receiving manner, refer to the foregoing descriptions.

In this embodiment of this application, if the first multicast service needs to be sent in each of the at least two cells, the first network device may determine the first parameter for the first multicast service, and send the first parameter to the one or more network devices corresponding to the at least two cells, so that the network devices corresponding to the at least two cells may all schedule the first multicast service by using the first parameter. This is equivalent to breaking a cell boundary. If a terminal device located in one of the at least two cells is located at an edge of the cell, and the terminal device can receive a signal of another cell of the at least two cells, the terminal device can receive a first multicast service sent in the another cell. In this way, because a same parameter is used for a same service, a terminal device located at an edge of a cell is not limited to only being capable of receiving a service of the cell, and may also receive the same service sent in another cell, so that a receiving success rate of the terminal device can be improved. In addition, the same service sent in the another cell is no longer an interfering signal for the terminal device, so that reception quality of the terminal device is improved.

The following describes, with reference to the accompanying drawings, apparatuses configured to implement the foregoing methods in the embodiments of this application. Therefore, all the foregoing content may be used in subsequent embodiments, and repeated content is not described again.

Figure 8:
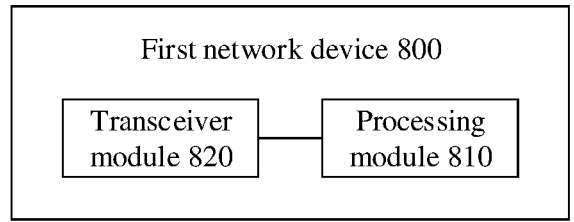
FIG. 8 is a schematic block diagram of a first type of first network device according to an embodiment of this application.

FIG. 8 is a schematic block diagram of a communication device 800 according to an embodiment of this application. For example, the communication device 800 is a first network device 800. The first network device 800 includes a processing module 810 and a transceiver module 820. The processing module 81o may be configured to perform all operations, except receiving and sending operations, performed by the first network device in the embodiment shown in FIG. 5, for example, S51 in the embodiment shown in FIG. 5, and/or configured to support another process of the technology described in this specification. The transceiver module 820 may be configured to perform all receiving and sending operations performed by the first network device in the embodiment shown in FIG. 5, for example, S52 in the embodiment shown in FIG. 5, and/or configured to support another process of the technology described in this specification.

The processing module 81o is configured to determine a first parameter for a first multicast service, where the first multicast service is associated with at least two cells, and the first parameter indicates a resource for transmission of the first multicast service.

The transceiver module 820 is configured to send the first parameter to a network device, where the network device is associated with the at least two cells.

In an optional implementation, the first parameter includes any combination of one or more of the following:
configured grant information of the first multicast service;
information about an RNTI corresponding to the first multicast service;
a DRX parameter corresponding to the first multicast service;
configuration information of a demodulation reference signal corresponding to the first multicast service;
rate matching reference signal information, used to indicate a location that is of a reference signal and that needs to be excluded when the first multicast service is received;
information about a scrambling sequence used by a PDSCH that carries the first multicast service; or
a service multiplexing identifier corresponding to the first multicast service, where the service multiplexing identifier is used to indicate data of the first multicast service.

In an optional implementation, the configured grant information that is of the first multicast service and that is included in the first parameter includes any combination of one or more of the following:
time domain information for transmission of the first multicast service;
frequency domain information for transmission of the first multicast service;
the configuration information of the demodulation reference signal corresponding to the first multicast service;
the rate matching reference signal information, used to indicate the location that is of the reference signal and that needs to be excluded when the first multicast service is received;
information about an antenna port for transmission of the first multicast service;
information about an MCS corresponding to the first multicast service; or
first indication information, used to indicate whether both the RNTI and the configured grant information need to be monitored.

In an optional implementation,
the processing module 810 is further configured to determine multicast BWP configuration information, where the multicast BWP configuration information includes information about at least one BWP, and information about each BWP includes any combination of one or more of the following: frequency domain information, subcarrier spacing information, or cyclic prefix length information; and
the transceiver module 820 is further configured to send the multicast BWP configuration information to the network device.

In an optional implementation, the first parameter further includes BWP indication information; and the BWP indication information is a BWP number, and the BWP number is associated with one piece of information in the information about the at least one BWP.

In an optional implementation, the first parameter further includes BWP indication information, where the BWP indication information is used to indicate that the first multicast service uses an initial BWP; or the BWP indication information is information about a BWP used by the first multicast service.

In an optional implementation, the processing module 810 is further configured to determine to reserve at least one RNTI for a multicast service; and the transceiver module 820 is further configured to send information about the at least one RNTI to the network device, to indicate the network device to reserve the at least one RNTI.

In an optional implementation, the processing module 810 is further configured to determine the at least two cells based on information about a cell in which a terminal device that is to receive the first multicast service is located, where the processing module 810 obtains, based on information received by the transceiver module 820 from a core network device, the information about the cell in which the terminal device that is to receive the first multicast service is located; or the processing module 810 obtains, based on information reported by the terminal device, the information about the cell in which the terminal device that is to receive the first multicast service is located.

It should be understood that the processing module 810 in this embodiment of this application may be implemented by a processor or a processor-related circuit component, and the transceiver module 820 may be implemented by a transceiver or a transceiver-related circuit component.

Figure 9:
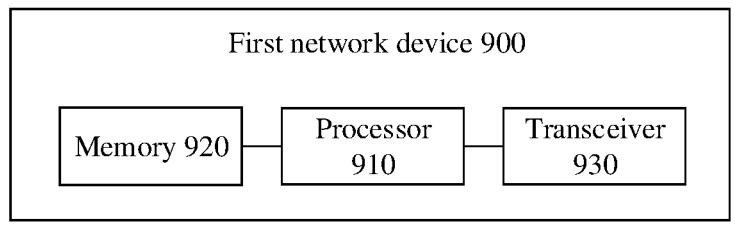
FIG. 9 is another schematic block diagram of a first type of first network device according to an embodiment of this application.

As shown in FIG. 9, an embodiment of this application further provides a communication device 900. For example, the communication device 900 is a first network device 900. The first network device 900 includes a processor 910, a memory 920, and a transceiver 930. The memory 920 stores instructions or a program. The processor 910 is configured to execute the instructions or the program stored in the memory 920. When the instructions or the program stored in the memory 920 is executed, the processor 910 is configured to perform an operation performed by the processing module 810 in the foregoing embodiment, and the transceiver 930 is configured to perform an operation performed by the transceiver module 820 in the foregoing embodiment.

It should be understood that the first network device 800 or the first network device 900 according to the embodiments of this application may correspond to the first network device in the embodiment shown in FIG. 5, and operations and/or functions of the modules in the first network device 800 or the first network device 900 are intended to implement corresponding procedures in the embodiment shown in FIG. 5. For brevity, details are not described herein again.

Figure 10:
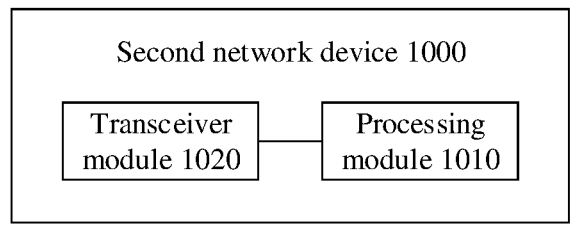
FIG. 10 is a schematic block diagram of a first type of second network device according to an embodiment of this application.

FIG. 10 is a schematic block diagram of a communication device 1000 according to an embodiment of this application. For example, the communication device 1000 is a second network device 1000. The second network device 1000 includes a processing module 1010 and a transceiver module 1020. The processing module 1010 may be configured to perform all operations, except receiving and sending operations, performed by the second network device in the embodiment shown in FIG. 5, for example, S53 in the embodiment shown in FIG. 5, and/or configured to support another process of the technology described in this specification. The transceiver module 1020 may be configured to perform all receiving and sending operations performed by the second network device in the embodiment shown in FIG. 5, for example, S52 and S54 in the embodiment shown in FIG. 5, and/or configured to support another process of the technology described in this specification.

The processing module 1010 is configured to determine first multicast service configuration information, where the first multicast service configuration information includes one or more parameters associated with transmission of each of at least one multicast service, one of the parameters includes BWP indication information, and the BWP indication information indicates a BWP used by a corresponding multicast service.

The transceiver module 1020 is configured to send the first multicast service configuration information to a terminal device.

In an optional implementation, the one of the parameters further includes any combination of one or more of the following:

configured grant information of the corresponding multicast service;

information about an RNTI corresponding to the corresponding multicast service;

a DRX parameter corresponding to the corresponding multicast service;

configuration information of a demodulation reference signal corresponding to the corresponding multicast service;

rate matching reference signal information, used to indicate a location that is of a reference signal and that needs to be excluded when the corresponding multicast service is received;

information about a scrambling sequence used by a PDSCH that carries the corresponding multicast service; or a service multiplexing identifier corresponding to the corresponding multicast service, where the service multiplexing identifier is used to indicate data of the corresponding multicast service.

In an optional implementation, the configured grant information includes any combination of one or more of the following:

time domain information for transmission of the corresponding multicast service;

frequency domain information for transmission of the corresponding multicast service;

the configuration information of the demodulation reference signal corresponding to the corresponding multicast service;

the rate matching reference signal information, used to indicate the location that is of the reference signal and that needs to be excluded when the corresponding multicast service is received;

information about an antenna port for transmission of the corresponding multicast service;

information about an MCS corresponding to the corresponding multicast service; or first indication information, used to indicate whether both the RNTI and the configured grant information need to be monitored.

In an optional implementation, the processing module 1010 is further configured to determine first multicast BWP configuration information, where the first multicast BWP configuration information includes information about at least one BWP, information about each BWP includes any combination of one or more of the following: frequency domain information, subcarrier spacing information, or cyclic prefix length information; and the transceiver module 1020 is further configured to send the first multicast BWP configuration information to the terminal device.

In an optional implementation, the BWP indication information is a BWP number, and the BWP number is associated with one piece of information in the information about the at least one BWP.

In an optional implementation, the BWP indication information is used to indicate that the first multicast service uses an initial BWP; or the BWP indication information is information about a BWP used by the first multicast service.

In an optional implementation, the transceiver module 1020 is further configured to: receive second multicast service configuration information from a first network device; and/or receive second multicast BWP configuration information from the first network device.

In an optional implementation, the transceiver module 1020 is further configured to: receive information about at least one RNTI from the first network device, and determine not to use the at least one RNTI when configuring an RNTI for a service.

In an optional implementation, the transceiver module 1020 is further configured to receive indication information from the first network device, where the indication information is used to indicate the second network device to independently schedule transmission of a second multicast service; and the processing module 1010 is further configured to: configure a resource to perform transmission of the second multicast service, and add information about the configured resource to the first multicast service configuration information.

It should be understood that the processing module 1010 in this embodiment of this application may be implemented by a processor or a processor-related circuit component, and the transceiver module 1020 may be implemented by a transceiver or a transceiver-related circuit component.

Figure 11:
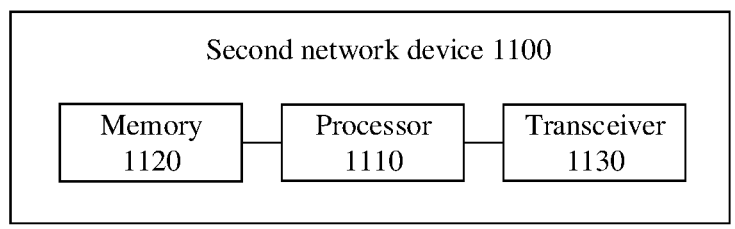
FIG. 11 is another schematic block diagram of a first type of second network device according to an embodiment of this application.

As shown in FIG. 11, an embodiment of this application further provides a communication device 1100. For example, the communication device 1100 is a second network device 1100. The second network device 1100 includes a processor 1110, a memory 1120, and a transceiver 1130. The memory 1120 stores instructions or a program. The processor 1110 is configured to execute the instructions or the program stored in the memory 1120. When the instructions or the program stored in the memory 1120 is executed, the processor 1110 is configured to perform an operation performed by the processing module 1010 in the foregoing embodiment, and the transceiver 1130 is configured to perform an operation performed by the transceiver module 1020 in the foregoing embodiment.

It should be understood that the second network device 1000 or the second network device 1100 according to the embodiments of this application may correspond to the second network device in the embodiment shown in FIG. 5, and operations and/or functions of the modules in the second network device 1000 or the second network device 1100 are intended to implement corresponding procedures in the embodiment shown in FIG. 5. For brevity, details are not described herein again.

Figure 12:
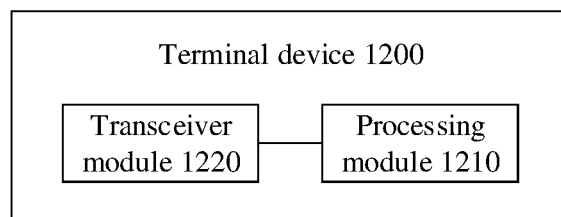
FIG. 12 is a schematic block diagram of a first type of terminal device according to an embodiment of this application.

FIG. 12 is a schematic block diagram of a communication device 1200 according to an embodiment of this application. For example, the communication device 1200 is a terminal device 1200. The terminal device 1200 includes a processing module 1210 and a transceiver module 1220. The processing module 1210 may be configured to perform all operations, except receiving and sending operations, performed by the terminal device in the embodiment shown in FIG. 5, for example, S55 and S56 in the embodiment shown in FIG. 5, and/or configured to support another process of the technology described in this specification. The transceiver module 1220 may be configured to perform all receiving and sending operations performed by the terminal device in the embodiment shown in FIG. 5, for example, S54 in the embodiment shown in FIG. 5, and/or configured to support another process of the technology described in this specification.

The processing module 1210 is configured to determine first multicast service configuration information, where the first multicast service configuration information includes one or more parameters associated with transmission of each of at least one multicast service, one of the parameters includes BWP indication information, and the BWP indication information indicates a BWP used by a corresponding multicast service.

The transceiver module 1220 is configured to receive the multicast service based on the first multicast service configuration information.

In an optional implementation, the one of the parameters further includes any combination of one or more of the following:

configured grant information of the corresponding multicast service;

information about an RNTI corresponding to the corresponding multicast service;

a DRX parameter corresponding to the corresponding multicast service;

configuration information of a demodulation reference signal corresponding to the corresponding multicast service;

rate matching reference signal information, used to indicate a location that is of a reference signal and that needs to be excluded when the corresponding multicast service is received;

information about a scrambling sequence used by a PDSCH that carries the corresponding multicast service; or a service multiplexing identifier corresponding to the corresponding multicast service, where the service multiplexing identifier is used to indicate data of the corresponding multicast service.

In an optional implementation, the configured grant information includes any combination of one or more of the following:

time domain information for transmission of the corresponding multicast service;

frequency domain information for transmission of the corresponding multicast service;

the configuration information of the demodulation reference signal corresponding to the corresponding multicast service;

the rate matching reference signal information, used to indicate the location that is of the reference signal and that needs to be excluded when the corresponding multicast service is received;

information about an antenna port for transmission of the corresponding multicast service;

information about an MCS corresponding to the corresponding multicast service; or first indication information, used to indicate whether both the RNTI and the configured grant information need to be monitored.

In an optional implementation, the transceiver module 1220 is configured to receive the multicast service based on the multicast configuration information in the following manner:

receiving the multicast service based on the configured grant information; or monitoring, based on the information about the RNTI corresponding to the multicast service, a PDCCH used to schedule the multicast service, and when the PDCCH is detected, receiving the multicast service based on the scheduling of the PDCCH; otherwise, receiving the multicast service based on the configured grant information.

In an optional implementation, the processing module 1210 is further configured to determine first multicast BWP configuration information, where the first multicast BWP configuration information includes information about at least one BWP, and information about each BWP includes any combination of one or more of the following: frequency domain information, subcarrier spacing information, or cyclic prefix length information; and the transceiver module 1220 is configured to receive the multicast service based on the first multicast service configuration information in the following manner: receiving the multicast service based on the first multicast service configuration information and the first multicast BWP configuration information.

In an optional implementation, the BWP indication information is a BWP number, and the BWP number is associated with one piece of information in the information about the at least one BWP.

In an optional implementation, the BWP indication information is used to indicate that the first multicast service uses an initial BWP; or the BWP indication information is information about a BWP used by the first multicast service.

In an optional implementation, the transceiver module 1220 is further configured to: receive the first multicast service configuration information from a second network device; and/or receive the first multicast BWP configuration information from the second network device.

In an optional implementation, the transceiver module 1220 is configured to receive the multicast service based on the first multicast service configuration information in the following manner: receiving the multicast service from one or more cells based on the first multicast service configuration information.

It should be understood that the processing module 1210 in this embodiment of this application may be implemented by a processor or a processor-related circuit component, and the transceiver module 1220 may be implemented by a transceiver or a transceiver-related circuit component.

Figure 13:
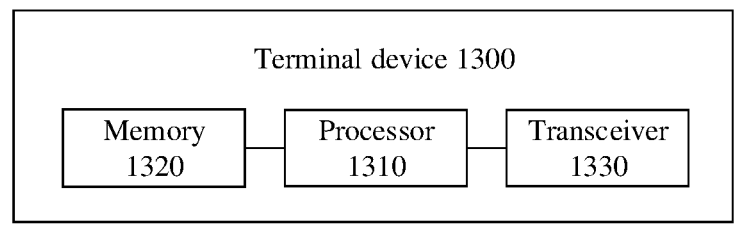
FIG. 13 is another schematic block diagram of a first type of terminal device according to an embodiment of this application.

As shown in FIG. 13, an embodiment of this application further provides a communication device 1300. For example, the communication device 1300 is a terminal device 1300. The terminal device 1300 includes a processor 1310, a memory 1320, and a transceiver 1330. The memory 1320 stores instructions or a program. The processor 1310 is configured to execute the instructions or the program stored in the memory 1320. When the instructions or the program stored in the memory 1320 is executed, the processor 1310 is configured to perform an operation performed by the processing module 1210 in the foregoing embodiment, and the transceiver 1330 is configured to perform an operation performed by the transceiver module 1220 in the foregoing embodiment.

It should be understood that the terminal device 1200 or the terminal device 1300 according to the embodiments of this application may correspond to the terminal device in the embodiment shown in FIG. 5, and operations and/or functions of the modules in the terminal device 1200 or the terminal device 1300 are intended to implement corresponding procedures in the embodiment shown in FIG. 5. For brevity, details are not described herein again.

An embodiment of this application further provides a communication apparatus. The communication apparatus may be a terminal device, or may be a circuit. The communication apparatus may be configured to perform an action performed by the terminal device in the foregoing method embodiment shown in FIG. 5.

Figure 14:
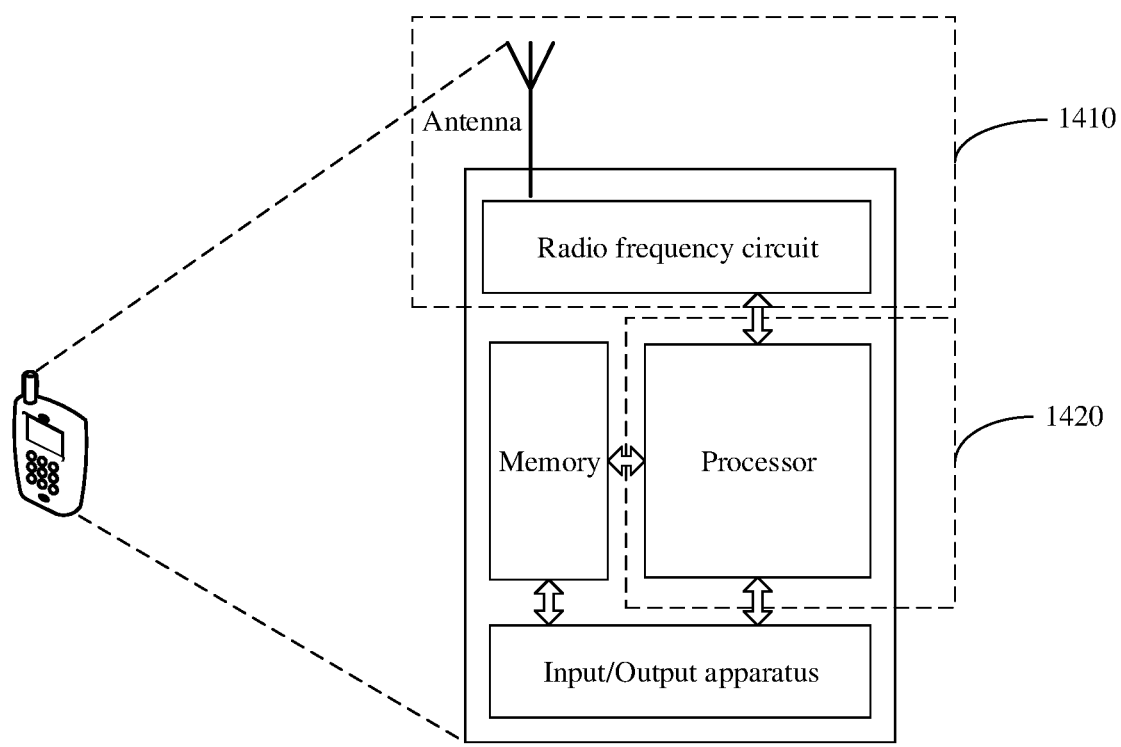
FIG. 14 is a schematic block diagram of a communication apparatus according to an embodiment of this application.

When the communication apparatus is a terminal device, FIG. 14 is a simplified schematic diagram of a structure of the terminal device. For ease of understanding and illustration, an example in which the terminal device is a mobile phone is used in FIG. 14. As shown in FIG. 14, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. A radio frequency circuit is mainly configured to: perform conversion between a baseband signal and a radio frequency signal, and process the radio frequency signal. The antenna is mainly configured to send and/or receive a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit, and the radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal by using the antenna, converts the radio frequency signal into a baseband signal, and outputs the baseband signal to the processor, and the processor converts the baseband signal into data and processes the data. For ease of description, FIG. 14 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the antenna and the radio frequency circuit that have receiving and sending functions may be considered as a transceiver unit of the terminal device, and the processor that has a processing function may be considered as a processing unit of the terminal device. As shown in FIG. 14, the terminal device includes the transceiver unit 1410 and the processing unit 1420. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiving circuit, or the like. The sending unit may also be sometimes referred to as a transmitter machine, a transmitter, a transmitter circuit, or the like.

It should be understood that the transceiver unit 1410 is configured to perform a sending operation and a receiving operation of a side of the terminal device in the foregoing method embodiment shown in FIG. 5, and the processing unit 1420 is configured to perform an operation other than the receiving operation and the sending operation of the side of the terminal device in the foregoing method embodiment shown in FIG. 5.

For example, in an implementation, the transceiver unit 1410 is configured to perform the receiving and sending steps of the side of the terminal device in the embodiment shown in FIG. 5, for example, S54. The processing unit 1420 is configured to perform the operation other than the receiving and sending operations of the side of the terminal device in the embodiment shown in FIG. 5, for example, S55 and S56.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 15:
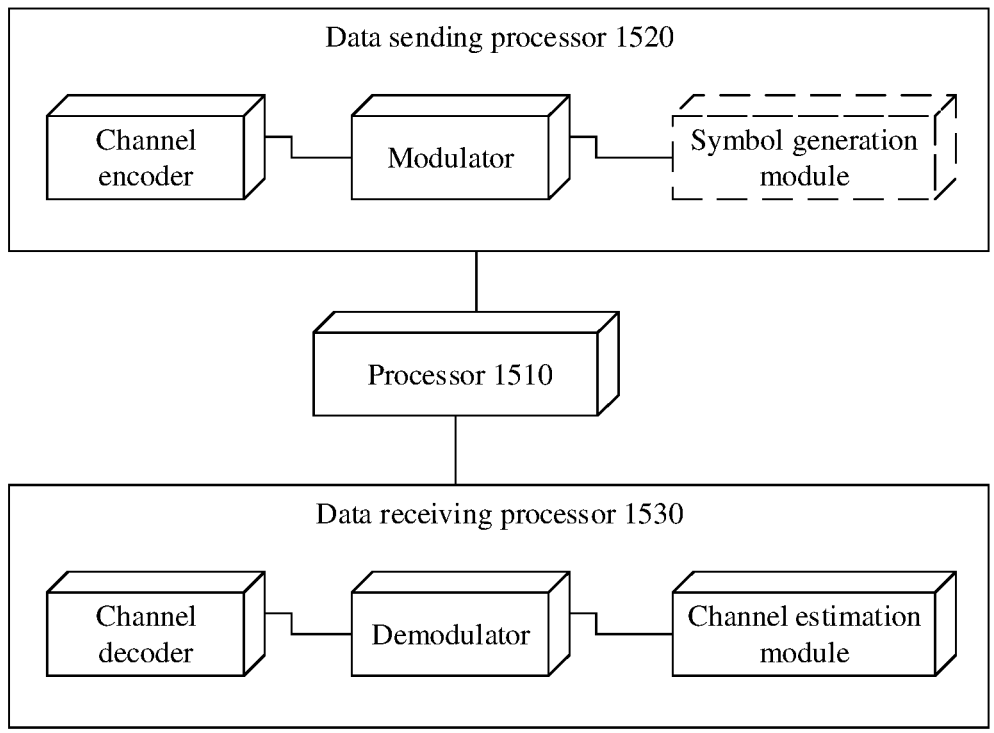
FIG. 15 is another schematic block diagram of a communication apparatus according to an embodiment of this application.

When the communication apparatus in this embodiment of this application is a terminal device, refer to a device shown in FIG. 15. In an example, the device may implement a function similar to a function of the processor 1510 in FIG. 15. In FIG. 15, the device includes a processor 1510, a data sending processor 1520, and a data receiving processor 1530. The processing module 1210 in the foregoing embodiment may be the processor 1510 in FIG. 15, and implements a corresponding function. The transceiver module 1220 in the foregoing embodiment may be the data sending processor 1520 and/or the data receiving processor 1530 in FIG. 15.

Although FIG. 15 shows a channel encoder and a channel decoder, it may be understood that the modules are merely examples, and do not constitute a limitation on this embodiment.

Figure 16:
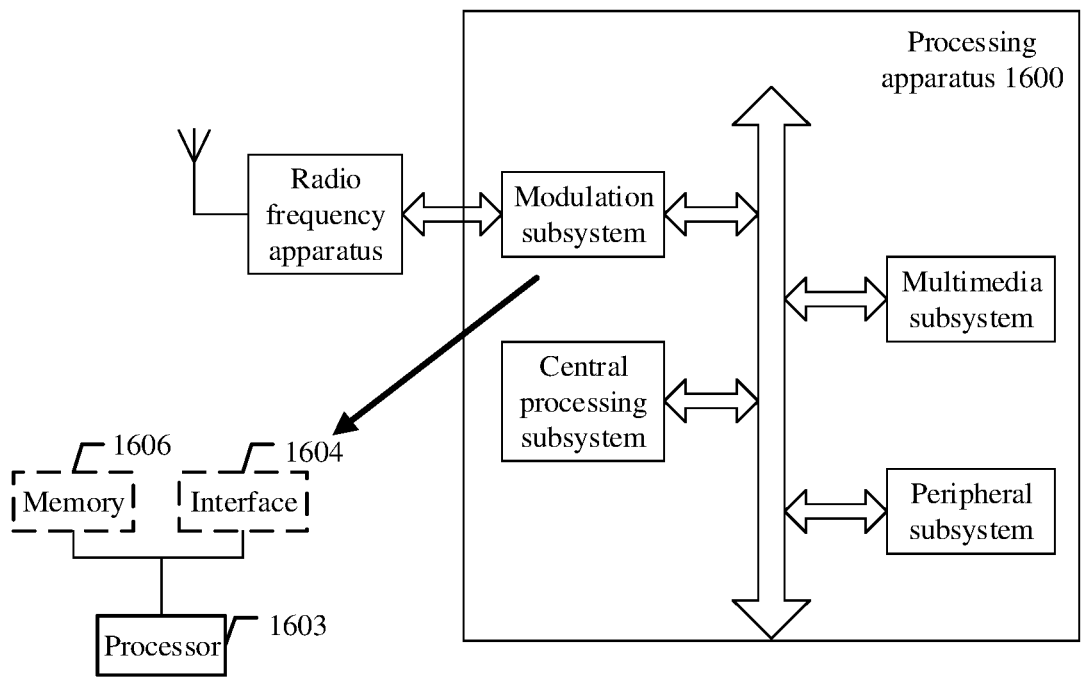
FIG. 16 is still another schematic block diagram of a communication apparatus according to an embodiment of this application.

FIG. 16 shows another form of this embodiment. A processing apparatus 1600 includes modules such as a modulation subsystem, a central processing subsystem, and a peripheral subsystem. The communication apparatus in this embodiment may be used as the modulation subsystem in the processing apparatus 1600. Specifically, the modulation subsystem may include a processor 1603 and an interface 1604. The processor 1603 implements a function of the processing module 1210, and the interface 1604 implements a function of the transceiver module 1220. In another variation, the modulation subsystem includes a memory 1606, the processor 1603, and a program that is stored in the memory 1606 and that can be run on the processor. When executing the program, the processor 1603 implements a method of a side of the terminal device in the foregoing method embodiment shown FIG. 5. It should be noted that the memory 1606 may be nonvolatile or volatile. The memory 1606 may be located in the modulation subsystem, or may be located in the processing apparatus 1600, provided that the memory 1606 can be connected to the processor 1603.

An embodiment of this application further provides a computer-readable storage medium. The computer-readable storage medium stores a computer program. When the program is executed by a processor, a procedure related to the first network device in the embodiment shown in FIG. 5 provided in the foregoing method embodiments may be implemented.

An embodiment of this application further provides a computer-readable storage medium. The computer-readable storage medium stores a computer program. When the program is executed by a processor, a procedure related to the second network device in the embodiment shown in FIG. 5 provided in the foregoing method embodiments may be implemented.

An embodiment of this application further provides a computer-readable storage medium. The computer-readable storage medium stores a computer program. When the program is executed by a processor, a procedure related to the terminal device in the embodiment shown in FIG. 5 provided in the foregoing method embodiments may be implemented.

An embodiment of this application further provides a computer program product including instructions. When the instructions are executed, the method of a side of the first network device in the method embodiment shown in FIG. 5 is performed.

An embodiment of this application further provides a computer program product including instructions. When the instructions are executed, the method of a side of the second network device in the method embodiment shown in FIG. 5 is performed.

An embodiment of this application further provides a computer program product including instructions. When the instructions are executed, the method of a side of the terminal device in the method embodiment shown in FIG. 5 is performed.

An embodiment of this application further provides an apparatus. The apparatus may be one of the terminal devices in the foregoing embodiments. A sending module, a sending unit, or a transceiver module in the terminal device may report capability indication information. The capability indication information indicates that the terminal device has a capability of performing steps S55 and S56, and a method performed by another terminal in the embodiments of this application. The capability indication information may be reported in response to a capability reporting message delivered by a network side device, or reported voluntarily (for example, during initialization).

An embodiment of this application further provides an apparatus. The apparatus may be one of the network devices in the foregoing embodiments, for example, the base station in FIG. 4A, the base station in FIG. 4B, the DU, the CU, or the base station in FIG. 4C, or the base station in FIG. 4D. A sending module, a sending unit, or a transceiver module in the apparatus may report capability indication information. The capability indication information indicates that the core network device or an upstream device (a device closer to a core network than the network device) has a capability of performing some or all of steps S52 to S54, and a method executed by another base station device in the embodiments of this application. The capability indication information may be reported in response to a capability reporting message delivered by the core network device, or reported voluntarily (for example, during initialization).

An embodiment of this application further provides a communication system. The communication system may include at least one first network device in the foregoing embodiments, and include at least one second network device in the foregoing embodiments. The first network device is, for example, the MCF in FIG. 4A, the MCF in FIG. 4B, the MCF in FIG. 4C, or the MCF in FIG. 4D. The second network device is, for example, the base station in FIG. 4A, the base station in FIG. 4B, the DU, the CU, or the base station in FIG. 4C, or the base station in FIG. 4D. For example, the first network device may be configured to perform all operations performed by the first network device in the embodiment shown in FIG. 5, for example, S51 and S52 in the embodiment shown in FIG. 5, and/or configured to support another process of the technology described in this specification. The second network device may be configured to perform all operations performed by the second network device in the embodiment shown in FIG. 5, for example, S52, S53, and S54 in the embodiment shown in FIG. 5, and/or configured to support another process of the technology described in this specification.

In an optional implementation, the communication system may further include at least one terminal device in the foregoing embodiments. For example, the terminal device may be configured to perform all operations performed by the terminal device in the embodiment shown in FIG. 5, for example, S54, S55, and S56 in the embodiment shown in FIG. 5, and/or configured to support another process of the technology described in this specification.

It should be understood that, the processor mentioned in the embodiments of this application may be a central processing unit (CPU), and may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It should further be understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that, in the embodiments of this application, sequence numbers of the foregoing processes do not mean execution sequences. The execution sequences of the processes should be determined based on functions and internal logic of the processes, and should not constitute any limitation to implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatuses, and units, refer to corresponding processes in the foregoing method embodiments. Details are not described herein again.

In the several embodiments provided in this application, it should be understood that the disclosed systems, apparatuses, and methods may be implemented in another manner. For example, the described apparatus embodiments are merely examples. For example, division into units is merely logical function division, and may be another manner of division during actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, a mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A communication method, comprising:
   determining, by a first network device, at least two cells in which a first multicast service is to be sent;
   in response to determining that the at least two cells are not neighbors, selecting, by the first network device, at least one neighboring cell;
   determining, by the first network device, a first parameter for the first multicast service, wherein the first multicast service is associated with a plurality of cells comprising the at least two cells and the neighboring cell, and the first parameter indicates a resource for combined transmission of the first multicast service from each of the at least two cells and the neighboring cell, wherein the first parameter comprises at least one radio network temporary identifier (RNTI) to be reserved for the first multicast service, wherein the at least one RNTI is determined by:
      receiving reservation response information from each network device of at least one second network device associated with the plurality of cells; and
      determining the at least one RNTI corresponding to the first multicast service based on the reservation response information from each network device of the at least one second network device; and
   sending, by the first network device, the first parameter to the at least one second network device, wherein the at least one second network device is associated with the plurality of cells, and wherein the plurality of cells are each configured based on the first parameter.

2. The method according to claim 1, wherein the first parameter further comprises any one of or combination of one or more of the following:
   configuration information of a demodulation reference signal corresponding to the first multicast service; or
   information about a scrambling sequence used by a physical downlink shared channel (PDSCH) that carries the first multicast service.

3. The method according to claim 2, wherein the first parameter further comprises configured grant information of the first multicast service, and the configured grant information comprises any one of or combination of one or more of the following:
   time domain information for transmission of the first multicast service;
   frequency domain information for transmission of the first multicast service;
   the configuration information of the demodulation reference signal corresponding to the first multicast service;
   rate matching reference signal information indicating a location that is of a reference signal and that is to be excluded when the first multicast service is received; or
   information about an antenna port for transmission of the first multicast service.

4. The method according to claim 1, wherein the method further comprises:
   determining, by the first network device, second multicast bandwidth part (BWP) configuration information, wherein the second multicast BWP configuration information comprises information about at least one BWP, and the information about the at least one BWP comprises any one of or combination of one or more of the following for each BWP: frequency domain information, subcarrier spacing information, or cyclic prefix length information; and
   sending, by the first network device, the second multicast BWP configuration information to the at least one second network device.

5. The method according to claim 4, wherein the first parameter further comprises BWP indication information; and
   wherein the BWP indication information comprises a BWP number, and the BWP number is associated with one piece of information in the information about the at least one BWP.

6. The method according to claim 1, wherein the first parameter further comprises configured grant information of the first multicast service, wherein the configured grant information comprises first indication information indicating that both a radio network temporary identifier (RNTI) corresponding to the first multicast service and the configured grant information need to be monitored.

7. The method according to claim 1, wherein the first parameter indicates that monitoring of a physical downlink control channel (PDCCH) scrambled by using a radio network temporary identifier (RNTI) is skippable.

8. The method according to claim 1, wherein the first parameter further comprises a service multiplexing identifier corresponding to the first multicast service, wherein the service multiplexing identifier indicates data of the first multicast service.

9. The method according to claim 8, wherein an association relationship between the data of the first multicast service and the first multicast service is identified by a logical channel.

10. The method according to claim 1, wherein the sending the first parameter further comprises sending cell identifiers (IDs), wherein the cell IDs comprise only the cell IDs for cells that are in the at least two cells and correspond to the at least one second network device.

11. The method according to claim 1, wherein the at least one RNTI is comprised in a list of RNTIs to be reserved, wherein the list of RNTIs to be reserved comprises a quantity of RNTIs that is greater than or equal to a quantity of services to be scheduled.

12. A communication method, comprising:
   determining, by a terminal device, first multicast service configuration information, wherein the first multicast service configuration information comprises one or more parameters associated with transmission of each multicast service of at least one multicast service, each parameter of the one or more parameters comprises bandwidth part (BWP) indication information, and each BWP indication information indicates a BWP used by a corresponding multicast service, wherein at least one parameter associated with at least a first multicast service of the at least one multicast service is determined from a same parameter as another multicast service of the at least one multicast service, wherein the one or more parameters comprises the same parameter, and wherein the one or more parameters further comprises at least one radio network temporary identifier (RNTI) to be reserved for the first multicast service, wherein the at least one RNTI is determined based on reservation response information from each network device of at least one second network device associated with a plurality of cells, the plurality of cells comprising at least two cells in which the first multicast service is to be sent and at least one neighboring cell selected in response to determining that the at least two cells are not neighbors; and receiving, by the terminal device, the at least one multicast service as a combined transmission from each of the plurality of cells based on the first multicast service configuration information.

13. The method according to claim 12, wherein each parameter of the one or more parameters further comprises any one of or combination of one or more of the following:
configuration information of a demodulation reference signal corresponding to the corresponding multicast service; or
information about a scrambling sequence used by a physical downlink shared channel (PDSCH) that carries the corresponding multicast service.

14. The method according to claim 13, wherein each parameter of the one or more parameters further comprises configured grant information of the first multicast service, and the configured grant information of each parameter of the one or more parameters comprises any combination of one or more of the following:
time domain information for transmission of the corresponding multicast service;
frequency domain information for transmission of the corresponding multicast service;
the configuration information of the demodulation reference signal corresponding to the corresponding multicast service;
rate matching reference signal information indicating a location that is of a reference signal and that is to be excluded when the corresponding multicast service is received; or
information about an antenna port for transmission of the corresponding multicast service.

15. The method according to claim 12, wherein each parameter of the one or more parameters further comprises configured grant information of the first multicast service, and the receiving, by the terminal device, the at least one multicast service based on the first multicast service configuration information comprises:
receiving, by the terminal device, the at least one multicast service based on the configured grant information; or
monitoring, by the terminal device based on information about an RNTI corresponding to the corresponding multicast service, a PDCCH used to schedule the at least one multicast service, and when the PDCCH is detected, receiving the at least one multicast service based on the scheduling of the PDCCH, otherwise, receiving the at least one multicast service based on the configured grant information.

16. A communication device, comprising:
a processor, configured to determine a first parameter for a first multicast service, wherein the first multicast service is associated with a plurality of cells comprising at least two cells and at least one neighboring cell, wherein the neighboring cell is selected in response to determining that the at least two cells are not neighbors, and the first parameter indicates a resource for combined transmission of the first multicast service from the at least two cells and the at least one neighboring cell, wherein the first parameter comprises at least one radio network temporary identifier (RNTI) to be reserved for the first multicast service, wherein the at least one RNTI is determined based on reservation response information from each network device of at least one second network device associated with the plurality of cells; and
a transceiver, configured to send the first parameter to the at least one second network device, wherein the at least one second network device is associated with the plurality of cells, and wherein the plurality of cells are each configured based on the first parameter.

17. A communication device, comprising:
a processor, configured to determine first multicast service configuration information, wherein the first multicast service configuration information comprises one or more parameters associated with transmission of each multicast service of at least one multicast service, each parameter of the one or more parameters comprises bandwidth part (BWP) indication information, and each BWP indication information indicates a BWP used by a corresponding multicast service, wherein at least one parameter associated with at least a first multicast service of the at least one multicast service is determined from a same parameter as another multicast service of the at least one multicast service, wherein the one or more parameters comprises the same parameter, and wherein the one or more parameters further comprises at least one radio network temporary identifier (RNTI) to be reserved for the first multicast service, wherein the at least one RNTI is determined based on reservation response information from each network device of at least one second network device associated with a plurality of cells, the plurality of cells comprising at least two cells in which the first multicast service is to be sent and at least one neighboring cell selected in response to determining that the at least two cells are not neighbors; and
a transceiver, configured to receive the at least one multicast service based on the first multicast service configuration information.

18. The communication device according to claim 17, wherein each parameter of the one or more parameters further comprises any combination of one or more of the following:
configuration information of a demodulation reference signal corresponding to the corresponding multicast service; or
information about a scrambling sequence used by a physical downlink shared channel (PDSCH) that carries the corresponding multicast service.

19. A chip system, wherein the chip system comprises:
at least one memory, configured to store instructions; and
at least one processor, configured to: invoke the instructions from the at least one memory and run the instructions, to enable a communication device on which the chip system is installed to perform the method according to claim 12.

20. A non-transitory computer-readable media storing at least one computer program, that when executed by one or more processors, causes the one or more processors to perform the method according to claim 12.

* * * * *